US010430741B2

(12) United States Patent
Spiro et al.

(10) Patent No.: US 10,430,741 B2
(45) Date of Patent: Oct. 1, 2019

(54) TASK ALLOCATION

(71) Applicant: Palantir Technologies Inc., Palo Alto, CA (US)

(72) Inventors: Ezra Spiro, New York, NY (US); Andre Frederico Cavalheiro Menck, New York, NY (US); Peter Maag, Brooklyn, NY (US); Thomas Powell, London (GB)

(73) Assignee: Palantir Technologies Inc., Palo Alto, CA (US)

( * ) Notice: Subject to any disclaimer, the term of this patent is extended or adjusted under 35 U.S.C. 154(b) by 4 days.

(21) Appl. No.: 15/839,745

(22) Filed: Dec. 12, 2017

(65) Prior Publication Data

US 2018/0174086 A1    Jun. 21, 2018

(30) Foreign Application Priority Data

Dec. 19, 2016  (GB) .................................. 1621627.7
Jul. 6, 2017    (EP) .................................... 17180136

(51) Int. Cl.
*G06F 9/455* (2018.01)
*G06Q 10/06* (2012.01)
(Continued)

(52) U.S. Cl.
CPC ... *G06Q 10/06313* (2013.01); *G05B 23/0283* (2013.01); *G06F 11/3476* (2013.01);
(Continued)

(58) Field of Classification Search
CPC ....................................................... G06F 9/52
(Continued)

(56) References Cited

U.S. PATENT DOCUMENTS 5,568,390 A   10/1996   Hirota et al.
5,857,329 A    1/1999   Bingham
(Continued)

FOREIGN PATENT DOCUMENTS

EP    0652513    5/1995
EP    1926074    5/2008
(Continued)

OTHER PUBLICATIONS

Ashraf, "Protect your Google Account (Gmail) by enabling SMS (text message) notifications for Suspicious Activity," online article from dotTech, Jan. 24, 2013, https://dottech.org/94405/how-to-setup-text-message-sms-google-notifications-for-suspicious-activity/.
(Continued)

*Primary Examiner* — Mehran Kamran
(74) *Attorney, Agent, or Firm* — Sheppard Mullin Richter & Hampton LLP

(57) ABSTRACT

A method of assigning a task to a resource in a multiple resource environment is performed by one or more processors or special-purpose computing hardware. The method includes receiving task information relating to at least one task to be performed by a resource in the multiple resource environment. The method also includes determining a cost value for each task, the cost value indicating a cost incurred if a maintenance event occurs during performance of the respective task. The method also includes receiving predictive maintenance information in relation to each of the multiple resources in the multiple resource environment, the predictive maintenance information indicating a likelihood of a maintenance event with respect to each of the multiple resources in the multiple resource environment. The method also includes allocating the at least one task to one of the resources in the multiple resource environment dependent
(Continued)

on the predictive maintenance information of the multiple resources and the calculated cost score.

15 Claims, 11 Drawing Sheets

(51) Int. Cl.
```
G06N 20/00      (2019.01)
G06Q 10/04      (2012.01)
G06Q 10/00      (2012.01)
G05B 23/02      (2006.01)
G06F 11/34      (2006.01)
G06Q 10/10      (2012.01)
```
(52) U.S. Cl.
CPC .............. *G06N 20/00* (2019.01); *G06Q 10/04* (2013.01); *G06Q 10/06* (2013.01); *G06Q 10/0631* (2013.01); *G06Q 10/0635* (2013.01); *G06Q 10/103* (2013.01); *G06Q 10/1097* (2013.01); *G06Q 10/20* (2013.01)

(58) Field of Classification Search
USPC .......................................................... 718/104
See application file for complete search history.

(56) References Cited

U.S. PATENT DOCUMENTS

| | | | |
|---|---|---|---|
| 5,902,349 A | 5/1999 | Endo et al. | |
| 6,496,774 B1 | 12/2002 | Davies | |
| 6,608,559 B1 | 8/2003 | Lemelson et al. | |
| 7,603,229 B2 | 10/2009 | Goldberg et al. | |
| 7,818,291 B2 | 10/2010 | Ferguson et al. | |
| 7,941,321 B2 | 5/2011 | Greenstein et al. | |
| 8,042,110 B1 | 10/2011 | Kawahara et al. | |
| 8,046,283 B2 | 10/2011 | Burns | |
| 8,108,138 B2 | 1/2012 | Bruce et al. | |
| 8,352,174 B2 | 1/2013 | Milstein et al. | |
| 8,417,409 B2 | 4/2013 | Bast et al. | |
| 8,763,078 B1 | 6/2014 | Castellucci et al. | |
| 8,776,076 B2* | 7/2014 | Chi .................... | G06Q 30/0283 709/223 |
| 8,786,605 B1 | 7/2014 | Curtis et al. | |
| 9,092,482 B2 | 7/2015 | Harris et al. | |
| 9,280,532 B2 | 3/2016 | Cicerone | |
| 9,904,587 B1* | 2/2018 | Potlapally ............. | G06F 11/079 |
| 2004/0153418 A1 | 8/2004 | Hanweck | |
| 2005/0055179 A1* | 3/2005 | Matheson .............. | G06Q 10/06 703/1 |
| 2005/0268299 A1* | 12/2005 | Picinich ................. | G06F 9/485 718/100 |
| 2006/0241856 A1 | 10/2006 | Cobleigh et al. | |
| 2007/0088596 A1 | 4/2007 | Berkelhamer et al. | |
| 2007/0198571 A1 | 8/2007 | Ferguson et al. | |
| 2007/0220604 A1 | 9/2007 | Long | |
| 2008/0062211 A1* | 3/2008 | Kamisuwa ............. | G03G 15/55 347/5 |
| 2008/0301559 A1 | 12/2008 | Martinsen et al. | |
| 2008/0313281 A1 | 12/2008 | Scheidl et al. | |
| 2009/0037912 A1 | 2/2009 | Stoitsev et al. | |
| 2009/0077257 A1* | 3/2009 | Savoor ................ | H04L 41/0681 709/232 |
| 2009/0138860 A1* | 5/2009 | Fusegawa ................ | G06F 8/70 717/131 |
| 2009/0199192 A1* | 8/2009 | Laithwaite ............ | G06Q 10/06 718/104 |
| 2009/0319418 A1 | 12/2009 | Herz | |
| 2010/0011255 A1* | 1/2010 | de Kleer ................ | G06Q 10/04 714/47.1 |
| 2010/0057521 A1* | 3/2010 | Jordan ................... | G06Q 10/06 705/7.11 |
| 2010/0162371 A1 | 6/2010 | Geil | |
| 2010/0205662 A1 | 8/2010 | Ibrahim et al. | |
| 2011/0041084 A1 | 2/2011 | Karam | |
| 2011/0153592 A1 | 6/2011 | DeMarcken | |
| 2011/0185401 A1 | 7/2011 | Bak et al. | |
| 2012/0101952 A1 | 4/2012 | Raleigh et al. | |
| 2012/0290506 A1 | 11/2012 | Muramatsu et al. | |
| 2013/0036346 A1 | 2/2013 | Cicerone | |
| 2013/0231862 A1 | 9/2013 | Delling et al. | |
| 2013/0286601 A1 | 10/2013 | Shin et al. | |
| 2014/0081685 A1 | 3/2014 | Thacker et al. | |
| 2014/0181833 A1 | 6/2014 | Bird et al. | |
| 2014/0298113 A1* | 10/2014 | Sakurai ............... | G06F 11/2025 714/47.3 |
| 2014/0355454 A1* | 12/2014 | Serban .................. | H04W 24/08 370/245 |
| 2015/0007261 A1* | 1/2015 | Hecht .................... | G06F 21/604 726/1 |
| 2015/0120176 A1 | 4/2015 | Curtis et al. | |
| 2015/0261817 A1 | 9/2015 | Harris et al. | |
| 2016/0147730 A1 | 5/2016 | Cicerone | |
| 2016/0203036 A1* | 7/2016 | Mezic .................... | G06F 11/079 714/819 |
| 2016/0283304 A1* | 9/2016 | Horikawa ............ | G06F 11/3409 |
| 2016/0285732 A1* | 9/2016 | Brech ..................... | H04L 43/14 |
| 2017/0017287 A1* | 1/2017 | Khatri ................... | G06F 1/3206 |
| 2017/0054592 A1* | 2/2017 | Olrog .................... | G06F 9/5027 |
| 2017/0060633 A1* | 3/2017 | Suarez Gracia ...... | G06F 9/5005 |
| 2017/0206127 A1* | 7/2017 | Thompson ........... | G06F 11/0793 |
| 2017/0236023 A1* | 8/2017 | Debnath .............. | G06K 9/4604 707/737 |
| 2017/0289062 A1* | 10/2017 | Artman .................... | H04L 67/18 |
| 2017/0300364 A1* | 10/2017 | Liu ......................... | H04W 4/028 |
| 2017/0351779 A1* | 12/2017 | Tarasov ............. | G06F 17/30887 |
| 2017/0371394 A1* | 12/2017 | Chan ..................... | G06F 1/3218 |

FOREIGN PATENT DOCUMENTS

| | | |
|---|---|---|
| EP | 2555126 | 2/2013 |
| EP | 2747000 | 6/2014 |
| EP | 2876587 | 5/2015 |
| WO | WO 2012/025915 | 3/2012 |

OTHER PUBLICATIONS

Ballesteros et al., "Batching: A Design Pattern for Efficient and Flexible Client/Server Interaction," Transactions on Pattern Languages of Programming, Springer Berlin Heildeberg, 2009, pp. 48-66.

Bogle et al., "Reducing Cross-Domain Call Overhead Using Batched Futures," SIGPLAN No. 29, 10 (Oct. 1994) pp. 341-354.

Chen et al., "A Novel Emergency Vehicle Dispatching System," 2013 IEEE 77th Vehicular Technology Conference, IEEE, Jun. 2, 2013, 5 pages.

Eklund et al., "A Dynamic Multi-source Dijkstra's Algorithm for Vehicle Routing," Intelligent Information Systems, 1996, pp. 329-333.

Hart et al., "A Formal Basis for the Heuristic Determination of Minimum Cost Paths," IEEE Transactions on Systems Science and Cybernetics, IEEE, vol. 1, No. 2, Jul. 1, 1968, pp. 100-107.

Jotshi et al., "Dispatching and Routing of Emergency Vehicles in Disaster Mitigation Using Data Fusion." Socio-Economic Planning Sciences, Pergamon, Amsterdam, Netherlands, vol. 43, No. 1, Mar. 1, 2009, 24 pages.

Mohring et al., "Partitioning Graphs to Speedup Dijkstra's Algorithm," ACM Journal of Experimental Algorithmics, Association of Computing Machinery, New York, New York, vol. 11, Jan. 1, 2006, 29 pages.

Official Communication for European Patent Application No. 17180136.8 dated Aug. 9, 2017.

Reedy, Sarah, "Policy and Charging Rules Function (PCRF)," Sep. 13, 2010, http://www.lightreading.com/document.asp?doc_id=680015 printed Dec. 10, 2013 in 4 pages.

Stamos et al., "Remote Evaluation," Journal ACM Transactions on Programming Languages and Systems (TOPLAS), vol. 12, Issue 4, Oct. 1990, pp. 537-564.

(56) References Cited

OTHER PUBLICATIONS

Vose et al., "Help File for Model Risk Version 5," 2007, Vose Software, pp. 349-353. [Uploaded in 2 Parts].
Wagner et al., "Dynamic Shortest Paths Containers," Electronic Notes in Theoretical Computer Science, vol. 92, No. 1, 2003, pp. 1-19.
Yang et al., "An Enhanced Routing Method with Dijkstra Algorithm and AHP Analysis in GIS-based Emergency Plan," Geoinformatics, 2010 18th International Conference on, IEEE, Piscataway, New Jersey, Jun. 18, 2010, 6 pages.

\* cited by examiner

TASK ALLOCATION

FIELD OF THE INVENTION

The present disclosure relates to a method and systems for allocating tasks in a multiple resource environment.

BACKGROUND

Machines and other resources are increasingly being fitted with sensors to record and control the functions of the machine and subsystems of the machine. For example, a diesel engine for construction machinery such as, for example, a bulldozer, digger and so forth may include sensors which measure, amongst other variables, injected fuel pressure, mass-flow of air into the engine, engine temperature, oxygen concentration in the outlet gases and so forth, to allow precise adjustments of the fuel/air mix. Similarly, a ship typically includes hundreds, thousands or tens of thousands of sensors measuring parameters such as speed, fuel temperature, stresses in the propeller shafts and so forth. Furthermore, quantities of data relating to a machine or other resource may be obtained from data input by users who monitor the maintenance of the machine or other resource. Many ships are powered by marine diesel engines, liquefied natural gas (LNG) engines or combi-fuel engines which may be powered using diesel or LNG. Some ships may include gas-turbine engines. Regardless of the particular type of engine, ship engines similarly include large numbers of sensors for operational, monitoring and diagnostic purposes.

The information thus gathered can be used in a variety of contexts.

SUMMARY

According to some embodiments of the present specification there is provided a method of assigning a task to a resource in a multiple resource environment. The method is performed by one or more processors or special-purpose computing hardware. The method includes receiving task information relating to at least one task to be performed by a resource in the multiple resource environment. The method also includes determining a cost value for each task, the cost value indicating a cost incurred if a maintenance event occurs during performance of the respective task. The method also includes receiving predictive maintenance information in relation to each of the multiple resources in the multiple resource environment, the predictive maintenance information indicating a likelihood of a maintenance event with respect to each of the multiple resources in the multiple resource environment. The method also includes allocating the at least one task to one of the resources in the multiple resource environment dependent on the predictive maintenance information of the multiple resources and the calculated cost score.

The method may also include ranking the multiple resources in accordance with the likelihood of a maintenance event with respect to each of the respective resources.

Allocating the at least one task to one of the resources may include allocating the task to the resource having the lowest likelihood of a maintenance event.

The task information may relate to a plurality of tasks. The method may also include ranking the plurality of tasks in accordance with the cost score of each of the respective tasks.

The method may also include selecting the task having the highest cost score and allocating the selected task to an available resource having the lowest likelihood of a maintenance event.

The method may also include identifying a subset of the multiple resources as available resources based on one or more criteria related to the or each task.

The cost incurred may include one or more of a time cost, a financial cost, a personnel cost, a component cost, a machinery cost, and a distance cost.

Receiving predictive maintenance information may include receiving maintenance information output from a machine learning model in relation to each of the resources.

The maintenance information from a machine learning model may include information derived from at least one of: sensor log data, fault log data, maintenance log data.

The predictive maintenance information for each resource may include an aggregated risk value based on risk values derived from one or more sub-systems of the resource.

According to some embodiments of the present specification there is provided a computer program comprising instructions, optionally stored on a non-transitory computer readable medium program which, when executed by a computing apparatus, causes the computing apparatus to perform the method.

According to some embodiments of the present invention there is provided an apparatus for assigning a task to a resource in a multiple resource environment. The apparatus includes one or more processors or special-purpose computing hardware configured to receive task information relating to at least one task to be performed by a resource in the multiple resource environment and to receive predictive maintenance information in relation to each of the multiple resources in the multiple resource environment, the predictive maintenance information indicating a likelihood of a maintenance event with respect to each of the multiple resources in the multiple resource environment. The apparatus also includes a cost determination module configured to determine a cost value for each task, the cost value indicating a cost incurred if a maintenance event occurs during performance of the respective task. The apparatus also includes a task allocation module configured to allocate the at least one task to one of the resources in the multiple resource environment dependent on the predictive maintenance information of the multiple resources and the calculated cost score.

The task allocation module may also be configured to rank the multiple resources in accordance with the likelihood of a maintenance event with respect to each of the respective resources.

The task information may relate to a plurality of tasks and the cost determination module may be configured to rank the plurality of tasks in accordance with the cost score of each of the respective tasks.

The predictive maintenance information for each resource may include an aggregated risk value based on risk values derived from one or more sub-systems of the resource.

DETAILED DESCRIPTION

Reference will now be made to certain examples which are illustrated in the accompanying drawings. Whenever possible, the same reference numbers will be used throughout the drawings to refer to the same or like parts.

Embodiments of the invention provide an improved method for allocating tasks to resources in a multiple resource environment. The tasks (e.g. travelling routes) are assigned to specific resources (e.g. ships or vehicles) in dependence upon the relative risks associated with a maintenance event (such as mechanical failure) of a resource during performance of the task. Risk information for each resource may be obtained from maintenance data that is held for each resource in the multiple resource environment. Cost values are calculated that are indicative of a cost incurred in the event of a maintenance event during performance of each particular task. Tasks incurring relatively high costs in the event of a maintenance event are assigned to resources determined to have a lower risk of a maintenance event. Tasks incurring relatively low costs in the event of a maintenance event may be assigned to resources determined to have a relatively higher risk of a maintenance event.

In certain embodiments, the multiple resources may be a fleet of ships. Tasks (i.e. routes to be travelled) may be selected depending on the risk analysis so that a ship having a significant risk of a maintenance event developing are allocated to routes having one or more ports that serve as maintenance hubs.

In certain embodiments, the multiple resources may be a fleet of non-road vehicles. Tasks to be performed by construction machinery such as, for example, a bulldozer, tractor, digger and so forth may include tasks associated with a construction project. The allocation of construction machinery to tasks may be dependent on the risk analysis so that construction machinery having a significant risk of a maintenance event developing are allocated to tasks which are located more closely to garages/maintenance facilities, replacements and/or within range of a recovery service.

Figure 1:
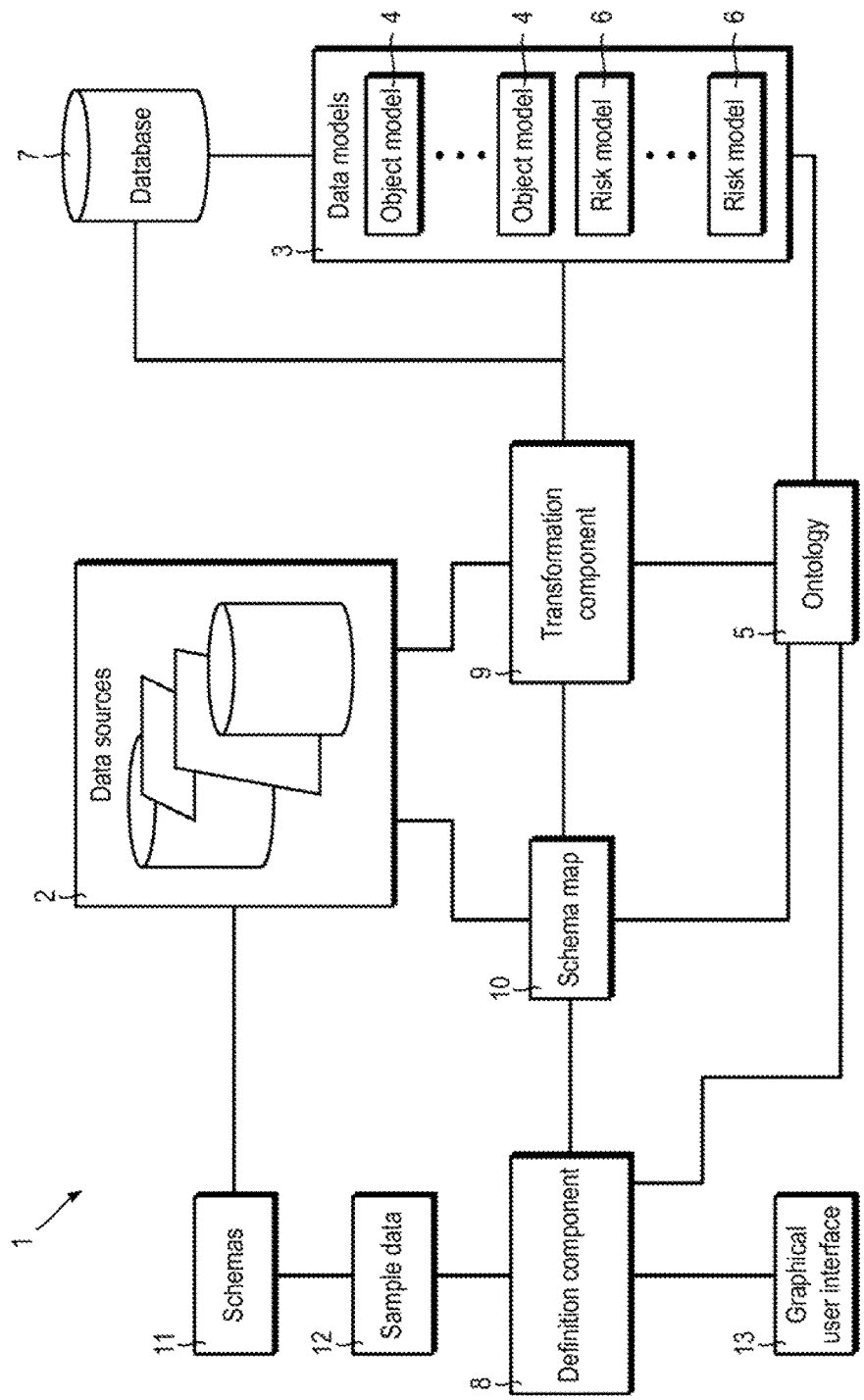
FIG. 1 is a block diagram illustrating a data fusion system for providing interactive data analysis.

FIG. 1 illustrates, in block diagram form, an exemplary data fusion system 1 for providing interactive data analysis, consistent with embodiments of the present disclosure. Among other things, data fusion system 1 facilitates analysis and transformation of one or more data sources 2 such as, for example, sensors 19 (FIG. 2), maintenance logs 16 (FIG. 2), fault logs 17 (FIG. 2), message logs 21 (FIG. 2) and so forth, into data models 3. Data models 3 may include one or more object models 4 whose semantics are defined by an ontology 5. Data models 3 may also include one or more risk models 6 for calculating a failure probability or risk score for a machine 15, or a sub-system 18 of the machine, during a particular interval. Risk models 6 are machine learning models or weighted average models generated in dependence upon data accessed from the data sources 2. The transformation can be performed for a variety of reasons. For example, an engineer or mechanic may import data from data sources 2 into a database 7 for persistently storing object model(s) 4. As another example, an engineer or mechanic may import data from data sources 2 in order to define, refine or apply a risk model 6. As another example, a data presentation component can transform input data from data sources 2 "on the fly" (in substantially real time, as the data is generated) into object model(s) 4. The object model(s) 4 can then be utilized, in conjunction with ontology 5, for analysis through graphs and/or other data visualization techniques. Data from data sources 2 may take the form of numerical data, text information in defined or free-text formats, or a combination of numerical, textual and/or other data types. Data from data sources 2 may be analysed to extract metrics in the process of transforming the data into object models 4 and/or risk models 6.

Data fusion system 1 includes a definition component 8 and a translation component 9, both implemented by one or more processors of one or more computing devices or systems executing hardware and/or software-based logic for providing various functionality and features of the present disclosure, as described herein. The data fusion system 1 can comprise fewer or additional components that provide the various functionalities and features described herein. Moreover, the number and arrangement of the components of data fusion system 1 which are responsible for providing the various functionalities and features described herein can further vary between different examples of the data fusion system 1.

The definition component 8 generates and/or modifies the ontology 5 and a schema map 10. Examples of defining an ontology (such as ontology 5) are described in U.S. Pat. No. 7,962,495 (the '495 patent), issued on Jun. 14, 2011, the entire contents of which are expressly incorporated herein by reference for all purposes. Consistent with certain examples disclosed in the '495 patent, a dynamic ontology may be used to create a database, for example database 7. To create a database ontology, one or more object types may be defined, where each object type includes one or more properties. The attributes of object types or property types of the ontology can be edited or modified at any time. At least one parser definition may be created for each property type. The attributes of a parser definition can be edited or modified at any time.

In some examples, each property type is declared to be representative of one or more object types. A property type is representative of an object type when the property type is intuitively associated with the object type. In some embodiments, each property type has one or more components and a base type. In some embodiments, a property type can comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is an "engine temperatures" property having an "exhaust temperature" component and an "inlet temperature" component.

For example, the "inlet temperature" may correspond to the temperature of ambient air drawn into a diesel engine and the "exhaust temperature" may correspond to the temperature of exhaust gasses expelled from the diesel engine. An example of raw input data is "300 K". An example parser definition specifies an association of imported input data to object property components as follows: {EXHAUST TEMPERATURE}, {INLET TEMPERATURE}→EngineTemperatures:EXHAUSTTemperature, EngineTemperatures:InletTemperature. In some embodiments, the association {EXHAUST TEMPERATURE}, {INLET TEMPERATURE} is defined in a parser definition using regular expression symbology. The association {EXHAUST TEMPERATURE}, {INLET TEMPERATURE} indicates that an exhaust temperature followed by an inlet temperature, and separated by a comma, comprises valid input data for a property of type "engine temperature".

According to some embodiments, schema map 10 can define how various elements of schemas 11 for data sources 2 map to various elements of ontology 5. Definition component 8 receives, calculates, extracts, or otherwise identifies schemas 11 for data sources 2. Schemas 11 define the structure of data sources 2; for example, the names and other characteristics of tables, files, columns, fields, properties, and so forth. Furthermore, definition component 8 optionally identifies sample data 12 from data sources 2. Definition component 8 can further identify object type, relationship, and property definitions from ontology 5, if any already exist. Definition component 8 can further identify pre-existing mappings from schema map 10, if such mappings exist. Some data sources 2 may be substantially unstructured, for example, in the form of free-text which is analysed for keywords and/or using natural language processing. For substantially unstructured data sources, the schema map 10 may define how various elements of schemas 11 map to ontology 5 for processing free-text, for example parameters or semantic rules.

Based on the identified information, definition component 8 can generate a graphical user interface 13. Graphical user interface 13 can be presented to users of a computing device via any suitable output mechanism (e.g., a display screen, an image projection, etc.), and can further accept input from users of the computing device via any suitable input mechanism (e.g., a keyboard, a mouse, a touch screen interface, etc.). Graphical user interface 13 features a visual workspace that visually depicts representations of the elements of ontology 5 for which mappings are defined in schema map 10.

In some embodiments, transformation component 9 can be invoked after schema map 10 and ontology 5 have been defined or redefined. Transformation component 9 identifies schema map 10 and ontology 5. Transformation component 9 further reads data sources 2 and identifies schemas 11 for data sources 2. For each element of ontology 5 described in schema map 10, transformation component 9 iterates through some or all of the data items of data sources 2, generating elements of object model(s) 4 in the manner specified by schema map 10. In some examples, the transformation component 9 may process data from data sources 2 to generate statistical or other metrics based on the data. The statistical or other metrics may be stored in the database 7. In some examples, the transformation component 9 may generate one or more risk models 6 based on the data from data sources 2. Risk models 6 generated by the transformation component 9 may be stored in the database 7. In some examples, the transformation component 9 may apply risk models 6 to data from data sources 2 in order to calculate a failure probability or risk score for a machine within a specified interval. In some examples, transformation component 9 can store a representation of each generated element of an object model 4 in the database 7. In some examples, transformation component 9 is further configured to synchronize changes in the object model(s) 4 back to data sources 2.

Data sources 2 can be one or more sources of data, including, without limitation, spreadsheet files, databases, email folders, document collections, sensor memory storages, and so forth. Documents may include native electronic documents and scanned documents. Scanned documents may be processed using optical character recognition. Data sources 2 can include data structures stored persistently in non-volatile memory. Data sources 2 can additionally or alternatively include temporary data structures generated from underlying data sources via data extraction components, such as a result set returned from a database server executing a database query.

Schema map 10, ontology 5, and schemas 11 can be stored in any suitable structures, such as XML files, database tables, and so forth. In some embodiments, ontology 5 is maintained persistently. Schema map 10 can or cannot be maintained persistently, depending on whether the transformation process is perpetual, or a one-time event. Schemas 11 need not be maintained in persistent memory, but can be cached for optimization.

The object model(s) 4 comprise collections of elements such as typed objects, numerical data, properties, and relationships. The collections can be structured in any suitable manner. In some examples, a database 7 stores the elements of the object model(s) 4, or representations thereof. In some examples, the elements of an object model 4 are stored within database 7 in a different underlying format, such as in a series of object, property, and relationship tables in a relational database. The risk models 6 comprise collections of elements such as, for example, weighting tables, decision trees, kernels, Bayesian graphs/networks, artificial neural networks or similar elements of a machine learning model.

According to some embodiments, the functionalities, techniques, and components described herein are implemented by one or more special-purpose computing devices. The special-purpose computing devices can be hard-wired to perform the techniques, or can include digital electronic devices such as one or more application-specific integrated circuits (ASICs) or field programmable gate arrays (FPGAs) that are persistently programmed to perform the techniques, or can include one or more general purpose hardware processors (each including processor circuitry) programmed to perform the techniques pursuant to program instructions in firmware, memory, other storage, or a combination. Such special-purpose computing devices can also combine custom hard-wired logic, ASICs, or FPGAs with custom programming to accomplish the techniques. The special-purpose computing devices can be desktop computer systems, portable computer systems, handheld devices, networking devices, or any other device that incorporates hard-wired and/or program logic to implement the techniques.

In examples described herein, data fusion system 1 can allow a user, such as an engineer or mechanic, to analyse information and identify underlying trends, patterns, behaviours and/or precursors which allow the engineer or mechanic to make more informed decisions. Such information can allow an engineer or mechanic to determine the most effective maintenance to perform on a machine. Additionally, when a fault or anomaly has developed in a complex machine, an engineer or mechanic may use the data fusion system 1 to obtain information about a root cause of an anomaly or fault. Other applications of the data fusion system 1 shall be described hereinafter.

For purposes of illustration, examples are described herein with reference to ships, for example passenger cruise ships, cargo ships, tankers and so forth. However, the examples and techniques described herein may be applied to other types of machines such as, for example, construction machinery in the form of bulldozers, tractors, diggers, any other types of mobile equipment. The examples and techniques described herein may also be applied to further types of machines such as, for example, manufacturing plant, sewage treatment plant, tunnelling/boring equipment and so forth, within the spirit and scope of this disclosure.

Figure 2:
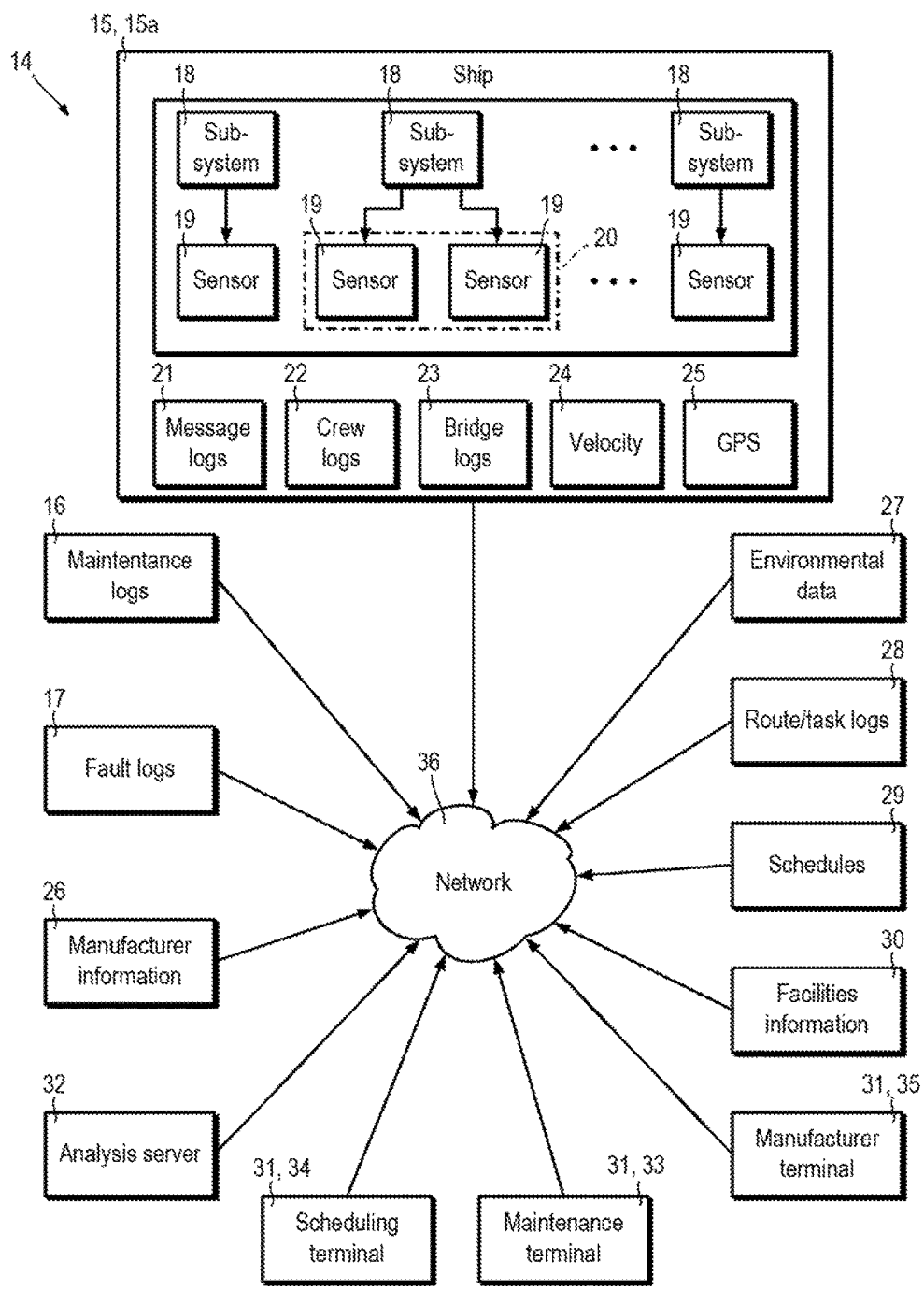
FIG. 2 is a block diagram of a first exemplary system for analysing and/or modelling a machine.

FIG. 2 shows a block diagram of a first exemplary system 14 for performing one or more operations for analysing and/or modelling a machine 15. In the first system 14, the machine 15 is a ship 15*a* and the first system 14 can include one or more ships 15*a*. The ships 15*a* may be, for example, passenger cruise ships, car transporter ferries, cargo ships, tanker ships, tugs and so forth. Each ship 15*a* has a corresponding maintenance log 16 and fault log 17. The maintenance log 16 for a ship 15*a* may include information such as dates and locations of maintenance, details of replacement parts used, free text notes made by an engineer or mechanic performing a maintenance task and so forth. The fault log 17 for a ship 15*a* may include information such as dates and locations of faults, the type of fault, the period of time required to rectify the fault and so forth. The maintenance logs 16 and fault logs 17 are stored in suitable computer readable formats or structures, such as XML files, database tables, and so forth. The maintenance log 16 and fault log 17 corresponding to a ship 15*a* may be stored on one or more servers and/or locally on the ship 15*a*. Maintenance logs 16 and fault logs 17 corresponding to a number of different ships 15*a* may be stored in a common database, for example database 7.

Each ship 15*a* includes a number of sub-systems 18 which may be mechanical systems, electrical systems, computer systems or combinations thereof. For example, sub-systems 18 for a ship 15*a* may include, but are not limited to, a navigational computer system, a crew area and/or cargo area environmental control and monitoring systems, a fuel management system, engine management systems, a hydraulic system, a fire suppression system, a bilge system and so forth. Each sub-system 18 may include one or more sensors 19 which monitor physical parameters of the sub-system. One or more sensors 19 associated with a sub-system form a sensor group 20. Examples of sensors 19 include a temperature sensor, a pressure sensor, a water level sensor, an electrical current or voltage sensor, a gas concentration sensor, a strain gauge, and so forth. Data from sensors 19 may be stored on the ship 15*a* and subsequently transmitted or downloaded from the ship 15*a* according to a schedule, for example upon arrival at a destination port, daily or weekly. Data from some sensors 19 may be transmitted to a central operations centre whilst the ship 15*a* is at sea.

The ship 15*a* may also store message logs 21, crew logs 22, bridge logs 23, velocity logs 24 and global positioning system (GPS) (or other positioning system) logs 25. The message log 21 corresponding to a ship 15*a* may include messages generated by controllers (e.g. an automated bilge pump controller), processors or similar devices which are integrated into the various sub-systems 18. The messages may include a date and time, an identifier of an originating sub-system 18, and message contents such as, for example, a warning or fault identifier. Crew logs 22 corresponding to a ship 15*a* may include forms, notes, checklists or other documents which are produced or confirmed by crew responsible for operating the ship 15*a* such as, for example, the captain, navigator, engineering crew and/or port crew. Crew logs 22 may include information derived from documents which are native electronic documents and/or scanned documents. Bridge logs 23 may include, for example, bridge audio recordings, logs detailing button presses, keystrokes and control inputs during a voyage and so forth. Velocity logs 24 may include a time series of velocities of the ship 15*a*. GPS logs 25 may include a time series of GPS coordinates for the ship 15*a*. Velocity logs and GPS logs are particular examples of sub-systems 18 and sensors 19. Message logs 21, crew logs 22, bridge logs 23, velocity logs 24 and global positioning system (GPS) logs 25 are stored in suitable computer readable formats or structures, such as XML files, database tables and so forth.

The first system 14 may also include manufacturer information 26 including, for example, databases providing information about messages and/or faults, suggested maintenance tasks, and manufacturer recommended tolerances for parameters measured by sensors 19. The first system 14 may also include environmental data 27 such as, for example, information about wind speeds, surface waves, cloud cover, storm systems, currents, tide times as a function of date, time and location. The first system 14 may also include a route/task log 28 corresponding to each ship 15*a*. The route/task log for a ship 15*a* may include details of the start and end locations, dates and times of each voyage conducted by the corresponding ship 15*a*. The first system 14 may also include schedules 29 for the voyages which a fleet including a number of ships 15*a* need to be assigned to travel over a forthcoming time period. The first system 14 may also include facilities information 30 such as, for example, a type or class of available maintenance and repair facilities at a number of ports between which ships 15*a* may be scheduled to travel, for example, whether a port has maintenance and inspection divers, dry-dock facilities and so forth.

The manufacturer information 26, environmental data 27, route/task logs 28, schedules 29 and facilities information 30 may be stored in suitable computer readable formats or structures, such as XML, files, database tables, and so forth. The manufacturer information 26, environmental data 27, route/task logs 28, schedules 29 and facilities information 30 may be stored in one or more servers.

The maintenance logs 16, fault logs 17, sensors 19, message logs 21, crew logs 22, bridge logs 23, altitude and velocity logs 25, GPS logs 25, manufacturer information 26, environmental data 27, route/task logs 28, schedules 29 and facilities information 30 are examples of data sources 2 for the data fusion system 1.

The first system 14 includes one or more analysis terminals 31 in the form of one or more computing devices (e.g., computer or computers, server or servers, etc.), memory storing data and/or software instructions (e.g., database or databases), memory devices, etc.), and other known computing components. In some examples, the one or more computing devices are configured to execute software or a set of programmable instructions stored on one or more memory devices to perform one or more operations, consistent with the examples herein. The data fusion system 1 may be provided by one or more analysis servers 32 and one or more analysis terminals 31 may connect to the analysis server 32 as clients. Alternatively, each analysis terminal 31 may provide an example of the data fusion system 1. Examples of analysis terminals 31 may provide the same or different functions. For example, different analysis terminals 31 may be able to access different types of data or functions of the analysis server 32. For example, a maintenance terminal 33 may be able to access preventative maintenance and troubleshooting functions. As another example, a scheduling terminal 34 may access data relating to risk model 6 outputs, schedules 29 and facilities information 30 to perform risk based scheduling of ship 15a routes. As another example, a manufacturer terminal 35 may be given access to a reduced or redacted selection of data from the data sources 2, in order to allow monitoring and analysis of technical data whilst preserving the integrity of commercially sensitive information. In some examples, all analysis terminals 31 may access the same data and functions.

The analysis terminals 31 and analysis server 32 communicate with the data sources 2 over a network 36. The network 36 can be any type of network or combination of networks configured to provide electronic communications between components of the first system 14. For example, the network 36 can be any type of network (including infrastructure) that provides communications, exchanges information, and/or facilitates the exchange of information, such as the Internet, a Local Area Network, or other suitable connection(s) that enables the sending and receiving of information between the components of the first system 14. The network 36 may also comprise any combination of wired and wireless networks. In other embodiments, one or more components of the first system 14 can communicate directly through a dedicated communication link or communication links, such as links between analysis terminals 31, analysis server 32, maintenance logs 16, fault logs 17, sensors 19, message logs 21, crew logs 22, bridge logs 23, velocity logs 25, GPS logs 25, manufacturer information 26, environmental data 27, route/task logs 28, schedules 29 and facilities information 30.

The first system 14 may include a number of machines 15 in the form of ships 15a, and all of the ships 15a forming part of the first system 14 are the same or comparable to one another. Two machines 15 are the same if they include the same components, arranged and configured in the same way. Two machines 15 may be the same if they are manufactured in the same batch or two machines 15 may be the same if they are manufactured in different batches. Two machines 15 which are the same include corresponding sub-systems 18 which are associated with corresponding sensors 19. Two machines 15 are comparable if they contain one or more corresponding sub-systems 18 in common. For two comparable machines 15, the corresponding common sub-systems 18 are not substantially interrelated to other sub-systems 18 which are not common to the machines 15. For example, two ships 15a may be comparable because they are fitted with the same marine diesel engine. Even when data from other systems is not comparable (or not directly comparable), information from engine sensors may be usefully compared between the two comparable ships 15a.

Figure 3:
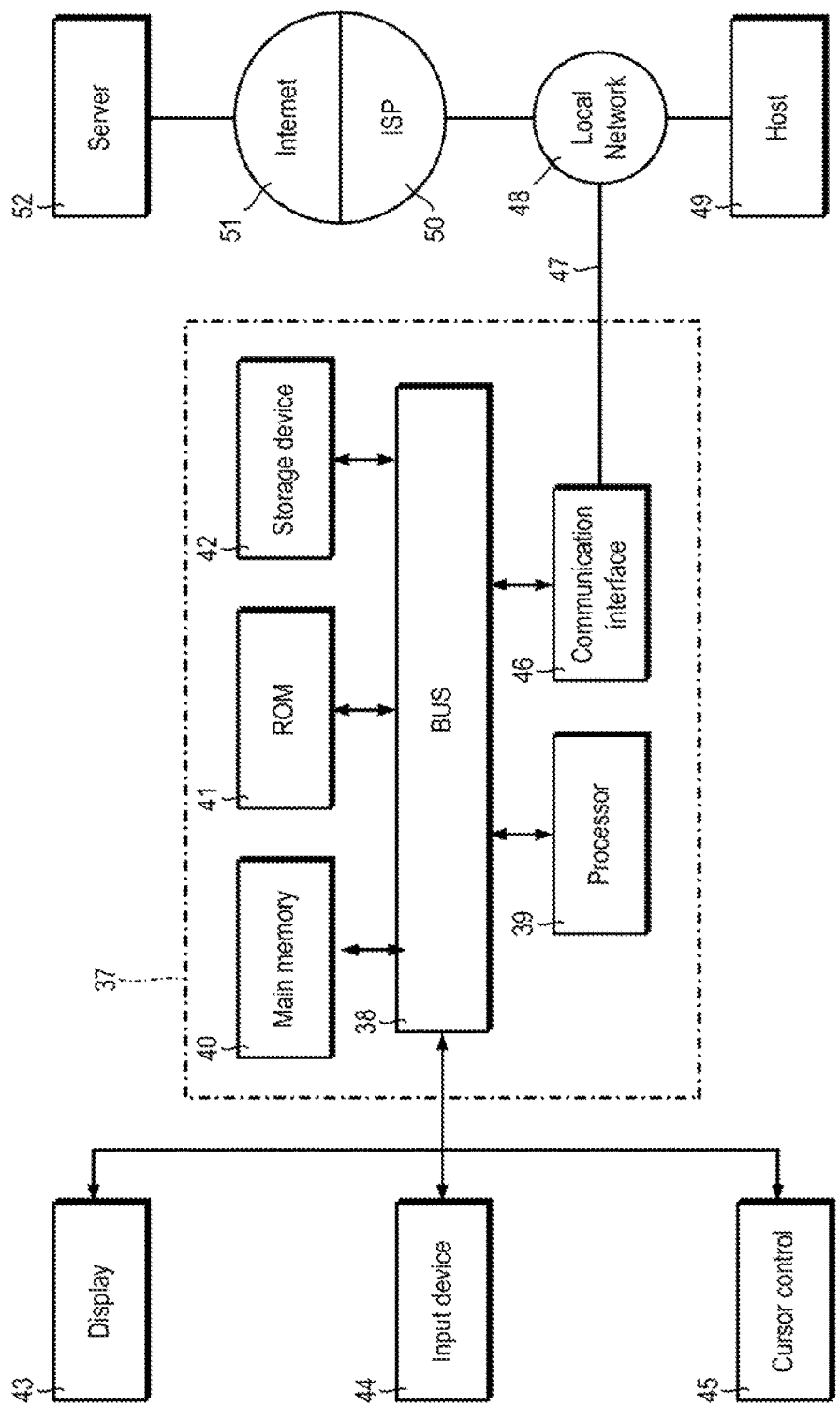
FIG. 3 is a block diagram of a computer system.

Referring also to FIG. 3, a block diagram of an exemplary computer system 37, consistent with examples of the present specification is shown. The components of the first and second exemplary systems 14, 67 (FIG. 11) such as analysis terminals 31 and analysis server 32 may include an architecture based on or similar to that of computer system 37.

Computer system 37 includes a bus 38 or other communication mechanism for communicating information, and a hardware processor 39 coupled with bus 38 for processing information. Hardware processor 39 can be, for example, a general purpose microprocessor. Hardware processor 39 comprises electrical circuitry.

Computer system 37 includes a main memory 40, such as a random access memory (RAM) or other dynamic storage device, which is coupled to the bus 38 for storing information and instructions to be executed by processor 39. The main memory 40 can also be used for storing temporary variables or other intermediate information during execution of instructions by the processor 39. Such instructions, when stored in non-transitory storage media accessible to the processor 39, render the computer system 37 into a special-purpose machine that is customized to perform the operations specified in the instructions.

Computer system 37 further includes a read only memory (ROM) 41 or other static storage device coupled to the bus 38 for storing static information and instructions for the processor 39. A storage device 42, such as a magnetic disk or optical disk, is provided and coupled to the bus 38 for storing information and instructions.

Computer system 37 can be coupled via the bus 38 to a display 43, such as a cathode ray tube (CRT), liquid crystal display, or touch screen, for displaying information to a user. An input device 44, including alphanumeric and other keys, is coupled to the bus 38 for communicating information and command selections to the processor 39. Another type of user input device is cursor control 45, for example using a mouse, a trackball, or cursor direction keys for communicating direction information and command selections to the processor 39 and for controlling cursor movement on the display 43. The input device typically has two degrees of freedom in two axes, a first axis (for example, x) and a second axis (for example, y), that allows the device to specify positions in a plane.

Computer system 37 can implement the techniques described herein using customized hard-wired logic, one or more ASICs or FPGAs, firmware and/or program logic which in combination with the computer system causes or programs computer system 37 to be a special-purpose machine. According to some embodiments, the operations, functionalities, and techniques disclosed herein are performed by computer system 37 in response to the processor 39 executing one or more sequences of one or more instructions contained in the main memory 40. Such instructions can be read into the main memory 40 from another storage medium, such as storage device 42. Execution of the sequences of instructions contained in main memory 40 causes the processor 39 to perform the process steps described herein. In alternative embodiments, hard-wired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device 42. Volatile media includes dynamic memory, such as main memory 40. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fibre optics, including the wires that comprise bus 38. Transmission media can also take the form of acoustic or light waves, such as those generated during radio-wave and infra-red data communications.

Various forms of media can be involved in carrying one or more sequences of one or more instructions to processor 39 for execution. For example, the instructions can initially be carried on a magnetic disk or solid state drive of a remote computer. The remote computer can load the instructions into its dynamic memory and send the instructions over a telephone line or other transmission medium using a modem. A modem local to computer system 37 can receive the data on the telephone line or other transmission medium and use an infra-red transmitter to convert the data to an infra-red signal. An infra-red detector can receive the data carried in the infra-red signal and appropriate circuitry can place the data on bus 38. Bus 38 carries the data to the main memory 40, from which the processor 39 retrieves and executes the instructions. The instructions received by the main memory 40 can optionally be stored on the storage device 42 either before or after execution by the processor 39.

Computer system 37 also includes a communication interface 46 coupled to the bus 38. The communication interface 46 provides a two-way data communication coupling to a network link 47 that is connected to a local network 48. For example, the communication interface 46 can be an integrated services digital network (ISDN) card, cable modem, satellite modem, or a modem to provide a data communication connection to a corresponding type of telephone line. As another example, the communication interface 46 can be a local area network (LAN) card to provide a data communication connection to a compatible LAN. Wireless links can also be implemented. In any such implementation, the communication interface 46 sends and receives electrical, electromagnetic or optical signals that carry digital data streams representing various types of information.

The network link 47 typically provides data communication through one or more networks to other data devices. For example, the network link 47 can provide a connection through the local network 48 to a host computer 49 or to data equipment operated by an Internet Service Provider (ISP) 50. The ISP 50 in turn provides data communication services through the world wide packet data communication network now commonly referred to as the "Internet" 51. The local network 48 and internet 51 both use electrical, electromagnetic or optical signals that carry digital data streams. The signals through the various networks and the signals on the network link 47 and through the communication interface 46, which carry the digital data to and from the computer system 37, are example forms of transmission media.

The computer system 37 can send messages and receive data, including program code, through the network(s), network link 47 and communication interface 46. In the internet example, a server 52, for example the analysis server 32, can transmit data through the internet 51, ISP 50, local network 48 and communication interface 46.

Figure 4:
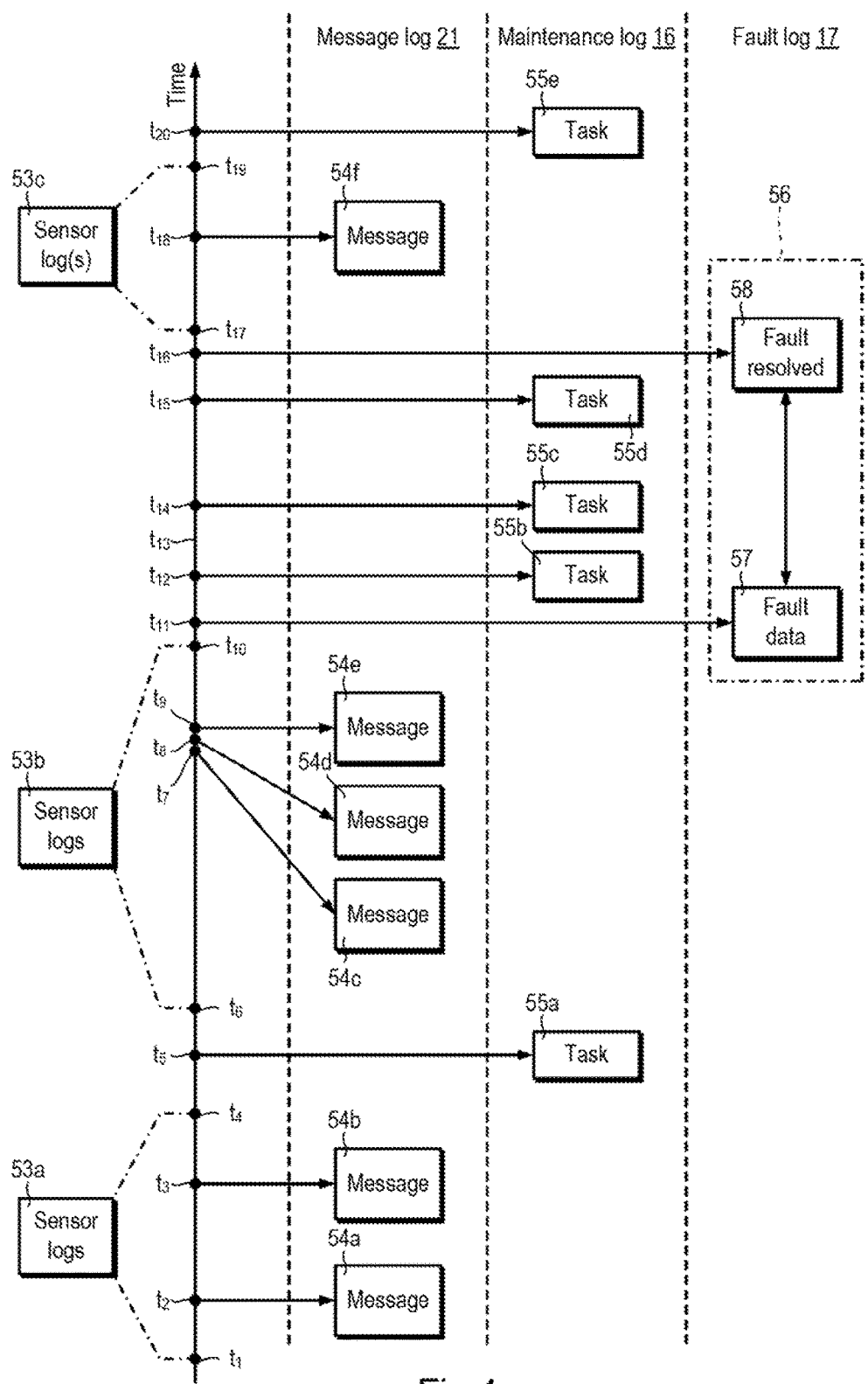
FIG. 4 schematically illustrates a timeline correspondence between data from different data sources.

Referring also to FIG. 4, an example timeline for a machine 15 in the form of a ship 15a will explained with reference to the corresponding message log 21, maintenance log 16, fault log 17 and a number of sensor logs 53 (e.g., 53a, 53b, 53c).

Each sensor log 53 may include a time series of parameter values measured by one or more sensors 19. The sensors 19 may include all of the sensors 19 on the ship 15a, all the sensors 19 associated with one or more subsystems 18, or any other combination of sensors 19. A sensor log 53 may include parameter values measured by a single sensor 19. Parameter values measured by one or more sensors 19 may be measured at equal intervals, or may be measured in response to triggering messages or events. Each sensor 19 may measure parameter values at a rate or interval specific to that sensor 19, to a type of sensor 19 or to a sub-system 18.

A first voyage commences at time $t_1$ and lasts until time $t_4$. The duration of a voyage $t_4-t_1$ may vary considerably depending upon the type of ship 15a. In one example, the ship 15a may be a passenger or vehicle ferry which carries out regular, scheduled voyages between a two or more relatively close ports/docks such as, for example, Dover and Calais, Dublin and Liverpool and so forth. In this example, the duration of a voyage $t_4-t_1$ may range from less than hour up to several days. Scheduled slots for preventative maintenance may be every day, or every week. Scheduled preventative maintenance may be conducted in one or more of the ports, and it may not be necessary to conduct preventative maintenance during the actual voyage.

In other examples, the ship 15a may be a long distance cargo ship or tanker, and the duration of a voyage $t_4-t_1$ may be weeks or months. In this example, preventative maintenance during the voyage cannot be avoided in practice. When the ship 15a is a long distance cargo ship or tanker, preventative maintenance may be split into regular maintenance conducted during voyages, and longer and/or more substantial maintenance slots between voyages. The range and type of maintenance tasks which may be conducted during a voyage may be restricted by the available facilities, consumables, spare parts, operational requirements and so forth.

In the example shown in FIG. 4, the ship 15a is a passenger and/or vehicle ferry which performs regular crossings of a relatively narrow body of water, for example a voyage may take several hours. In the example shown in FIG. 4, regular maintenance is scheduled to occur between voyages. The corresponding parameter values measured by all or a subset of the sensors 19 during the first voyage are stored as a first sensor log 53a. Alternatively, separate first sensor logs 53a may be stored for each sub-system 18 or separate first sensor logs 53a may be stored for each sensor 19. During the first voyage, a first message object 54a is generated by a sub-system 18 and stored in the message log 21, along with the corresponding time $t_2$ and optionally other contextual information such as an identifying number for the voyage. A message object 54 (e.g., 54a, 54b, 54c, 54d, 54e, 54f) may include a message identity (ID) code consisting of letters and/or numbers. The message ID code may correspond to an entry in a look-up table providing further details. For example, a message ID code may take the form A-M-001, in which the letter "A" denotes an origin of the corresponding message object 54 in a first, or "A", sub-system 18, the letter "M" denotes that the message ID code corresponds to a message and should be looked up in a message look-up table, and the numeric code "001" denotes a first entry corresponding to the first sub-system 18 in the message look-up table. The corresponding entry in the message look-up table provides details of the message. The look-up table may be included in the manufacturer information 26, for example in a maintenance manual. Similarly, a message ID code of B-M-023 would identify a message object 54 originating in a second, or "B", sub-system 18 and so forth.

A second message object 54b is generated during the first voyage at time t3 and stored in the message log 21. Message object 54 contents may correspond to, for example, warnings and/or faults. Message object 54 contents may be determined by looking up message ID codes in a message look-up table. A message object 54 may correspond to the illumination of a warning light on the bridge, or illumination of a warning light elsewhere in or on the ship 15a, for example in the engine room.

A second voyage starts at time t6 and finishes at time $t_{10}$, and corresponding sensor 19 measurements are stored in one or more second sensor logs 53b, in the same way as the first sensor log(s) 53a. Between the first and second voyages, at a time $t_5$, a first maintenance task object 55a is recorded in the maintenance log 16 for the ship 15a. The first maintenance task object 55a may include information such as the time, $t_5$, and a maintenance task identity (ID) code consisting of letters and/or numbers. The maintenance task ID code may correspond to an entry in a look-up table providing further details. For example, a maintenance task ID code may take the form A-T-003, in which the letter "A" denotes a maintenance task carried out on a first, or "A", sub-system 18, the letter "T" denotes that the maintenance task ID code corresponds to a maintenance task and should be looked up in a maintenance task look-up table, and the numeric code "003" denotes a third entry corresponding to the first sub-system 18 in the maintenance task look-up table. The corresponding entry in the maintenance task look-up table provides details of the maintenance task which is carried out. The look-up table may be included in the manufacturer information 26. The first maintenance task object 55a may include further information such as, for example, free-text notes or descriptions of the maintenance task performed, details of any parts replaced, information about the engineer or mechanic responsible for carrying out the maintenance task and so forth. The first maintenance task object 55a is not occasioned by a fault, and corresponds to regular, or preventative, maintenance.

A third voyage is scheduled to start at a time $t_{13}$. However, the start time of the third voyage is delayed until $t_{17}$ due to a fault object 56 which is registered at a time $t_{11}$, shortly after the end of the second voyage at time $t_{10}$. The fault object 56 may correspond to a fault which is discovered following, for example, inspection by the ship crew or port staff, analysis of the second sensor log 53b, or the fault may have been indicated by third to fifth message objects 54c, 54d, 54e, which were recorded in a cluster at times $t_7$, $t_8$ and $t_9$. The fault object 56 is recorded in the fault log 17. The fault object 56 includes fault data 57 indicating the time corresponding to the fault object 56, details about the type of fault, the location of the ship 15a when the fault was registered and so forth. The fault data 57 may also include a fault identity (ID) code consisting of letters and/or numbers. The fault ID code may correspond to an entry in a look-up table providing further details. For example, a fault ID code may take the form C-F-012, in which the letter "C" denotes a fault arising in a third, or "C", sub-system 18, the letter "F" denotes that the fault ID code corresponds to a fault type and should be looked up in a fault type look-up table, and the numeric code "012" denotes a twelfth entry corresponding to the third sub-system 18 in the fault type look-up table. The corresponding entry in the fault type look-up table provides details of the fault type which has occurred. The fault type look-up table may be included in the manufacturer information 26.

Sometimes a fault corresponding to a fault object 56 may be readily rectified. On other occasions, the root cause of a fault corresponding to a fault object 56 in a ship 15a, or a fault in another machine 15, may be difficult to determine. Consequently, an engineer or mechanic may conduct one or more maintenance tasks which fail to resolve the fault. For example, both the second and third maintenance tasks objects 55b, 55c, started at times $t_{12}$ and $t_{14}$ respectively, both corresponding to maintenance tasks which failed to resolve the fault corresponding to the fault object 56. The fourth maintenance task object 55d, started at time $t_{15}$, corresponds to a maintenance task which did resolve the fault corresponding to the fault object 56. When the fault corresponding to the fault object 56 is verified to have been solved, fault resolution data 58 is added to the fault object 56 in the fault log 17. The fault resolution data 58 is linked to the fault data 57. The fault resolution data 58 may include information such as the end time of fault, for example $t_{16}$, and the maintenance task object 55d corresponding to the maintenance task which resolved the fault corresponding to the fault object 56.

Once the fault corresponding to the fault object 56 is resolved, the delayed third voyage starts at a time $t_{17}$ and ends at a time $t_{19}$. A sixth message object 54f is generated during the third voyage, at time $t_{15}$, but the sixth message object 54f does not indicate a new fault or a recurrence of the earlier fault corresponding to fault object 56. Regular or preventative maintenance, in the form of a maintenance task detailed by a fifth maintenance task object 55e, is conducted after the third voyage at a time $t_{20}$.

It will be appreciated that the sequence of events described in relation to FIG. 4 is for illustrative purposes only, and that the contents of the present specification may be applied to other sequences of events. For example, in the case of a ship 15a which a long distance cargo ship or tanker, voyages may last for weeks or even months, and so sensor logs 53 corresponding to the entire voyage may be inappropriate. Instead, sensor logs 53 for a ship 15a which a long distance cargo ship or tanker may be analysed according to shorter time periods, for example, daily, hourly or substantially in real time. Furthermore, in the case of a ship 15a which a long distance cargo ship or tanker, maintenance tasks 55 (e.g., 55a, 55b, 55c, 55d, 55e) corresponding to preventative maintenance and/or fault resolution may also be conducted during a voyage.

Message logs 21 may be populated in real time, i.e. message objects 54 generated by a machine 15 such as a ship 15a may be stored to a corresponding message log 21 at the same time, or shortly after, each message object 54 is generated. Maintenance logs 16 and fault logs 17 may be updated after the relevant events, for example, by filling in an electronic document or by scanning a paper document and so forth.

Statistical metrics may be derived from the parameter values measured by sensors 19. For example, if a parameter value does not vary substantially over time, simple time series statistics may be applied to derive a mean value, a standard deviation, a minimum and a maximum value for each type of parameter value included in a sensor log 53. Average, or baseline, values may be obtained by aggregating a large number of sensor logs 53 corresponding to a number of different machines 15 and different operations of the machines 15. For example, when the machines 15 are ships 15a, each operation may correspond to a different voyage, and when the machines 15 take form of construction machinery 15b (FIG. 11) each operation may correspond to a different journey, a work order, a lease period, or a fixed period of time such as one working day. Deviations of measured parameter values from the average values may be used as statistical metrics for analysis by the data fusion system 1.

Figure 5:
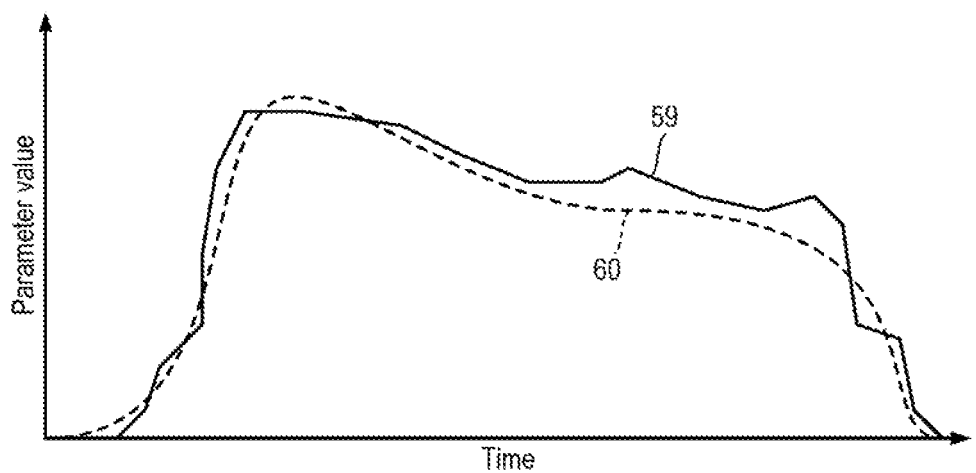
FIGS. 5 and 6 illustrate determining statistical metrics from measured parameter values.
Figure 11:
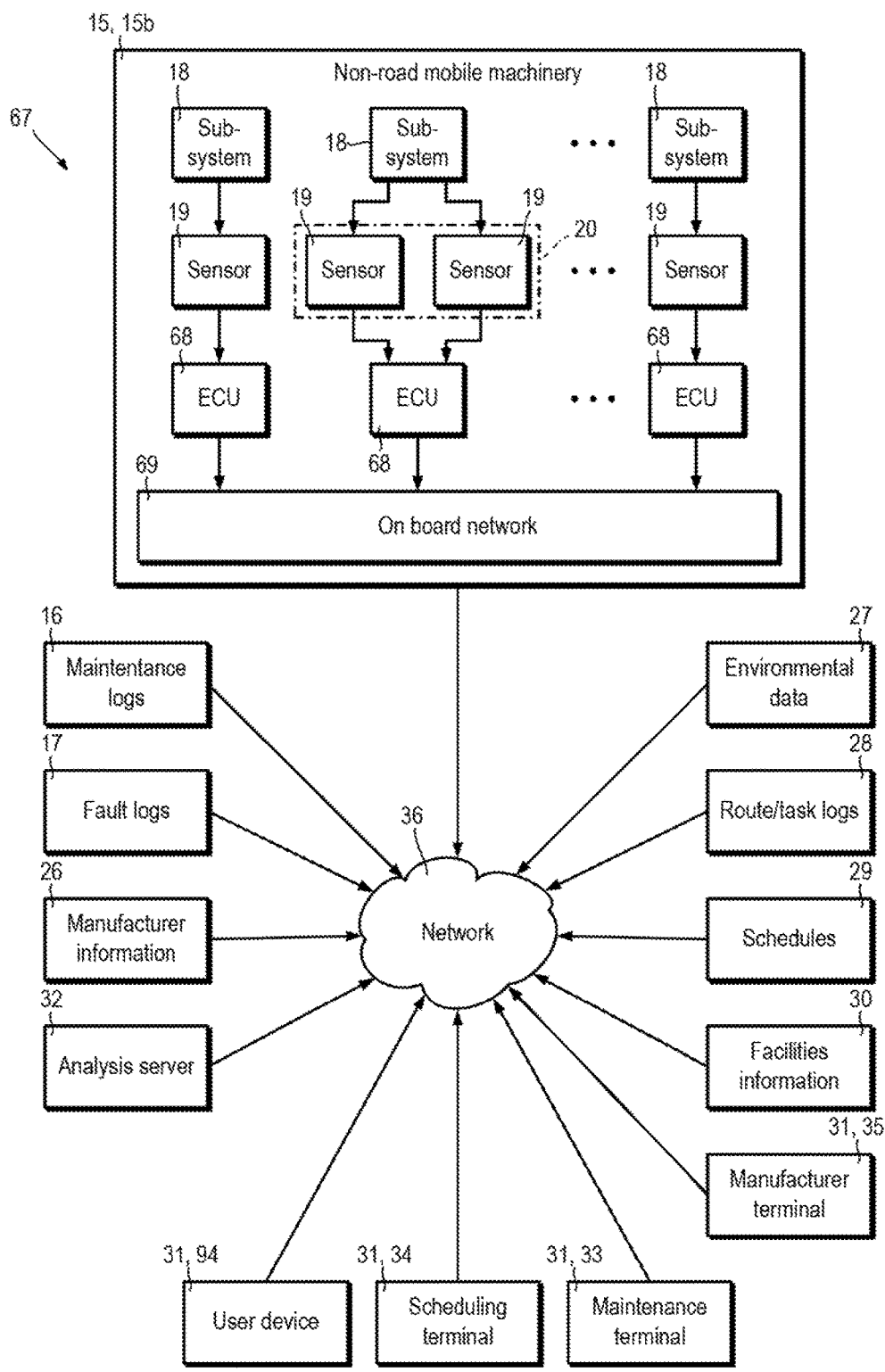
FIG. 11 is a block diagram of a second exemplary system according to embodiments of this specification for analysing and/or modelling a machine.

Referring also to FIG. 5, the values of some parameters measured by sensors 19 will vary with time, for example, over the course of a voyage when the machine 15 is a ship 15a or throughout a working day of construction machinery 15b (FIG. 11). The parameter values may be plotted against time as a parameter curve 59. By aggregating a large number of sensor logs 53 corresponding to a number of different machines 15 and different operations, a mean value, a standard deviation, a minimum and a maximum value of a the parameter may be determined as a function of time. The averaged parameter values may be plotted against time as an average parameter curve 60. Suitable statistical metrics may be calculated such as, for example, the mean and standard deviation of a difference between the parameter curve 59 and the average parameter curve 60. Minimum and maximum differences may also be used as statistical metrics. The same approach may be used to determine statistical metrics based on a difference between first and second parameter curves stored in first and second sensor logs 53. Average parameter curves 60 (and related average statistical metrics) may be updated to take account of new sensor logs 53 by re-calculating average parameter curves 60 (and related average statistical metrics) according to a schedule, for example, daily or weekly. Alternatively, if sensor logs 53 are extracted from the machines 15 at periodic intervals, then the average parameter curves 60 (and related average statistical metrics) may be re-calculated immediately after new sensor logs 53 have been extracted.

Parameter curves 59 need not be plotted against time. Instead, a parameter curve 59 corresponding to a first parameter measured by a first sensor 19 may be plotted against a second parameter measured by a second sensor 19. Statistical metrics and average parameter curves 60 may be calculated in the same way. Analysing a pair of parameters can be useful in diagnosing a developing fault or issue. For example, in a normally functioning diesel engine, the stable operating temperature may vary with the revolutions per minute (RPM) according to a characteristic parameter curve, for example an average parameter curve 59. If a parameter curve 59 significantly deviates from the average parameter curve 60, for example, if the parameter curve 59 shows a faster than expected increase in temperature with RPM, this may indicate a developing fault in coolant levels or in a coolant system.

Figure 6:
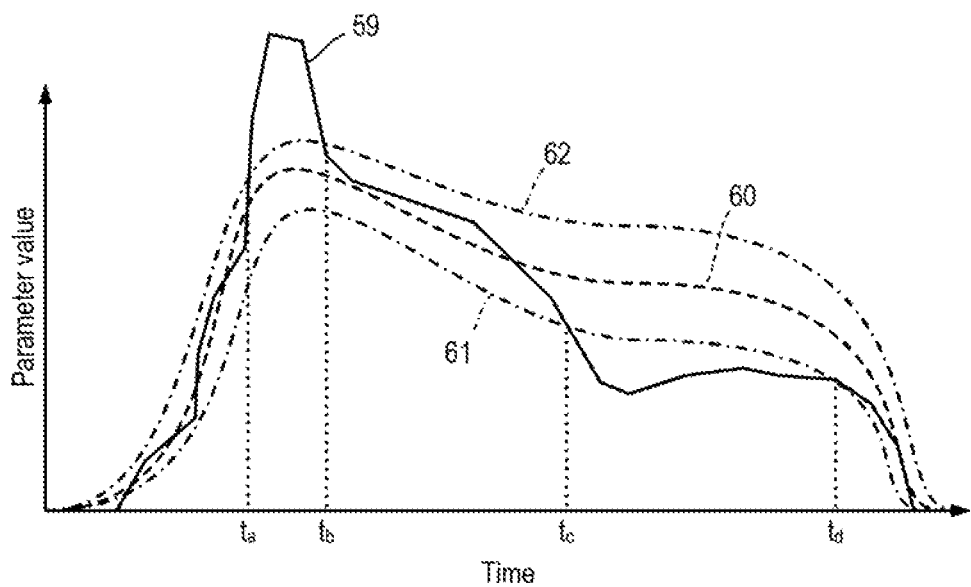

Referring also to FIG. 6, additional statistical metrics may be derived from the sensor logs 53. For example, the number and duration of intervals during which the parameter curve 59 differs from the average parameter curve 60 by more than a threshold amount may be calculated and used as a metric. For example, the number and duration of intervals during which the parameter curve 59 lies below the $25^{th}$ percentile 61 or above the $75^{th}$ percentile 62 may be recorded. In the example shown in FIG. 6, the parameter curve 59 exceeds the $75^{th}$ percentile 62 for a first interval $t_b$–$t_a$ and dips below the $25^{th}$ percentile 61 for a second interval $t_d$–$t_c$. A Schmidt trigger may be used, for example at the $75^{th}$ and $80^{th}$ percentiles, to determine that the parameter curve 59 has exceeded a specified tolerance.

Other thresholds may be used such as, for example, whether the parameter curve 59 deviates from an average parameter curve 60 by more than a multiple of a standard deviation σ. For example, instead of the $75^{th}$ percentile 62, an upper threshold may be the average parameter curve 60 plus 3σ, and instead of the $25^{th}$ percentile 61, a lower threshold may be the average parameter curve 60 minus 3σ. The standard deviation σ may in general be a function of time or of a second parameter.

For machines 15 such as ships 15a or construction machinery 15b (FIG. 11), many parameters will vary with time, but the duration of different sensor logs 53 need not be the same because each sensor log 53 corresponds to a different operation of the same machine 15 or of a different machine 15. This can prevent naïve aggregation of corresponding parameter values belonging to first and second sensor logs 53a, 53b. For example, one working day for construction machinery 15b (FIG. 11) will vary dramatically from a subsequent working day because construction machinery 15b may be used to perform slightly different tasks and the duration and loading of each task may also vary from day to day. Sensors 19 recording parameters of a machine 15 may record datasets corresponding to two or more tasks or occasions which differ to the extent that direct comparison is difficult or meaningless. Such difficulties may be overcome by applying a dynamic time warping algorithm to the sensor logs 53.

Figure 7:
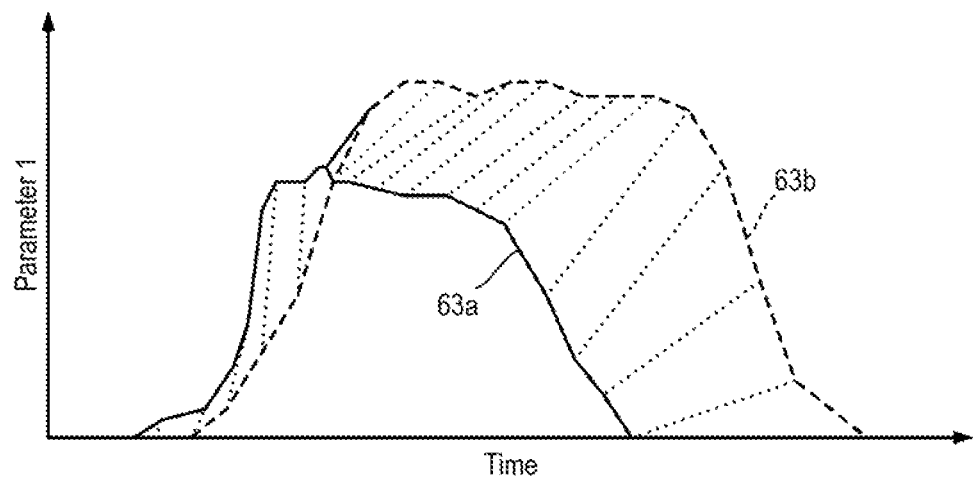
FIGS. 7 and 8 illustrate application of dynamic time warping to allow comparison between first and second curves of a first parameter.
Figure 8:
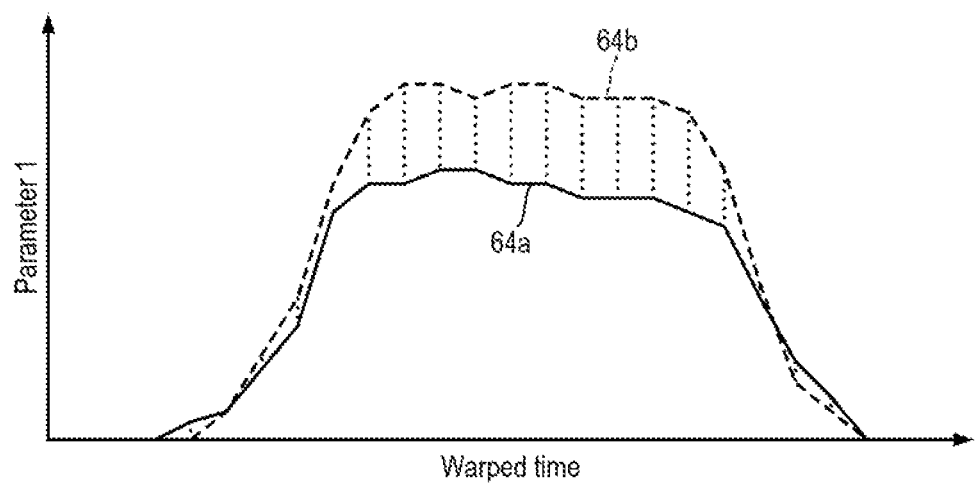

Referring also to FIGS. 7 and 8, first and second curves 63a, 63b of a first parameter are not directly comparable because they have differing lengths. The first and second curves 63a, 63b correspond to first and second sensor logs 53a, 53b respectively. However, a dynamic time warping algorithm may be used to distort the relative time-bases so that first and second warped curves 64a, 64b of the first parameter may be compared. The first parameter may be a parameter having a well understood meaning, such as velocity of a ship 15a, or the velocity and/or engine revolutions per minute (RPM) of construction machinery 15b (FIG. 11). Suitable first parameters may often correspond to the external state of a machine 15, for example, to ambient conditions or to a task which the machine 15 is performing.

Figure 9:
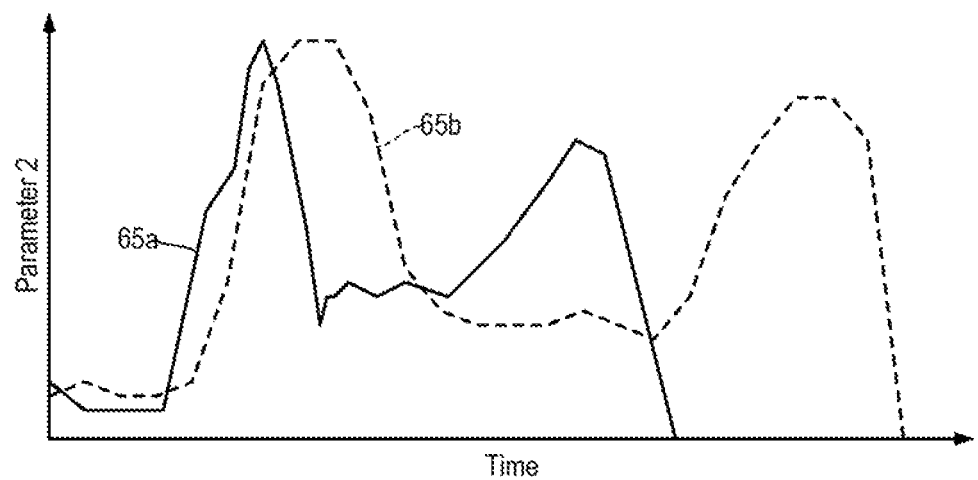
FIGS. 9 and 10 illustrate dynamic time warping of first and second curves of a second parameter based on the dynamic time warping of curves of the first parameter as shown in FIGS. 7 and 8.
Figure 10:
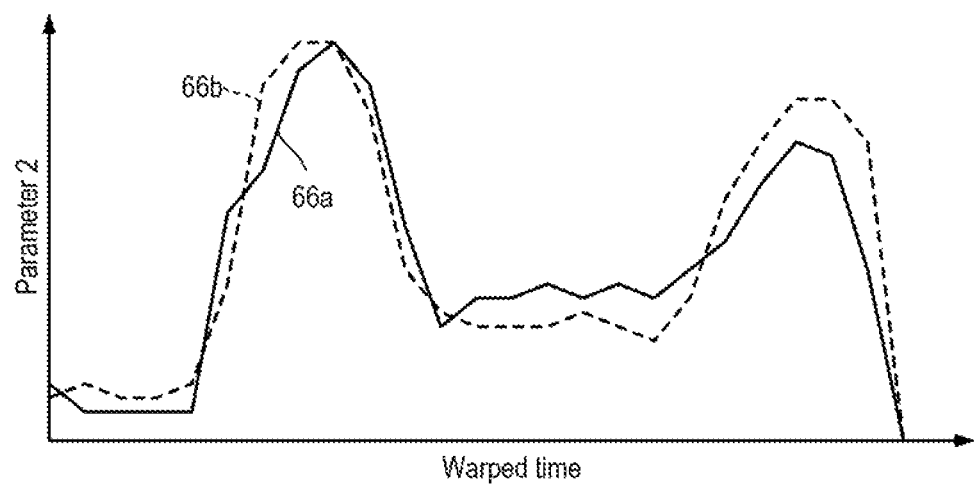

Referring also to FIGS. 9 and 10, first and second curves 65a, 65b of a second parameter may be less well understood or simply less suited to feature extraction. Such second parameters may relate more directly to the internal functioning or internal status of the machine 15. For example, when the machine 15 is a ship 15a, the second parameter may be a temperature of part of a gas turbine engine or a marine diesel engine. As another example, when the machine 15 is construction machinery 15b (FIG. 11), the second parameter may be the pressure of a pneumatic or hydraulic actuation system. Parameters relating to the internal functioning or internal status of the machine 15 may have less predictable or less regular features, which can complicate or prevent the direct application of a dynamic time-warping algorithm, which may lead to erroneous outputs. This issue can be avoided by generating warped curves 66a, 66b of the second parameter based on a warped time-frame established using the curves 63a, 63b of the first parameter. For example, if the machine 15 is a ship 15a or construction machinery 15b, parameters such as engine temperatures may be warped using a time-frame warping established based on parameters such as velocity or engine RPM of the ship 15a or construction machinery 15b.

By using an initial parameter curve as a reference, a large number of sensor logs 53 corresponding to a large number of different machines 15 and operations may be warped, then aggregated to obtain a mean value, a standard deviation, a minimum and a maximum value of each parameter to be determined for the purpose of calculating statistical metrics. Similarly, a large number of sensor logs 53 corresponding to a large number of different machines 15 and operations may be warped, then aggregated to obtain warped average parameter curves.

Log metrics may be determined using the computer readable logs corresponding to each machine 15. For example, when the machine 15 is a ship 15a, metrics may be determined based on the maintenance log 16, fault log 17, message log 21, crew log 22 and bridge log 23 corresponding to each ship 15a, as well as any environmental data 27, route/task logs 28 and so forth. For example, keyword searching may be used to establish frequencies of occurrence of particular words or phrases during one or more time intervals. Additionally or alternatively, when the message objects 54 include message ID codes, the maintenance task objects 55 include maintenance task ID codes and/or the fault objects 56 include fault ID codes, log metrics may be determined in the form of frequencies of occurrence of each message ID code, maintenance task ID code and/or fault ID code during one or more time intervals.

Additionally, ontology 5 may include semantic rules allowing natural language processing of computer readable logs, such as the maintenance logs 16, fault logs 17, message logs 21, crew logs 22, bridge logs 23, environmental data 27, route/task logs 28 and so forth. Natural language processing may enable determination of other log metrics.

It will be appreciated that many different examples of statistical metrics and metrics derived from computer readable logs may be used with the data fusion system 1, depending on the data sources 1 which are used.

Referring also to FIG. 11, a block diagram of a second exemplary system 67 for performing one or more operations for analysing and/or modelling a machine 15 is shown. In the second system 67, the machine 15 is construction machinery 15b and the second system 67 can include one or more construction machines 15b. The second system 67 may be used to help managing a fleet of construction machines 15b which are made available for leasing, or to manage all of the construction vehicles associated with a particular construction project. Construction machinery 15b may include be vehicles such as, for example, bulldozers, diggers, cranes, tractors, combine harvesters and so forth. Each construction machine 15b has a corresponding maintenance log 16 and fault log 17. The maintenance log 16 for a construction machine 15b may include information such as dates and locations of maintenance, details of replacement parts, free text notes made by an engineer or mechanic performing a maintenance task and so forth. The fault log 17 for a construction machine 15b may include information such as dates and locations of faults, the type of fault, the period of time required to rectify the fault and so forth. The maintenance logs 16 and fault logs 17 are stored in suitable computer readable formats or structures, such as XML files, database tables, and so forth. The maintenance log 16 and fault log 17 corresponding to a construction machine 15b may be stored on one or more servers and/or locally on the construction machine 15b itself. Maintenance logs 16 and fault logs 17 corresponding to a number of different construction machines 15b may be stored in a common database, for example database 7.

A construction machine 15b includes a number of sub-systems 18 which may be mechanical systems, electrical systems, computer systems or combinations thereof. Sub-systems 18 of a construction machine 15b may be controlled by one or more corresponding electronic control units 68 (ECUs), and the ECUs 68 of a construction machine 15b are interconnected for communications by an on-board network 69. Each sub-system 18 may include one or more sensors 19 which monitor corresponding physical parameters of the sub-system 18. One or more sensors 19 associated with a sub-system 18 form a sensor group 20. Examples of sensors 19 include a temperature sensor, a pressure sensor, an electrical current or voltage sensor, a gas concentration sensor, a strain gauge, and so forth. Data from sensors 19 may be stored on the construction machine 15b and subsequently transmitted or downloaded from the construction machine 15b according to a schedule, for example, upon arrival to a designated "home" location, daily or weekly. Data from some sensors 19 may be transmitted to a server via wireless networks operating at a storage location or operational location of a construction machine 15b. Data from some sensors 19 may be transmitted to a server via cellular networks during operation of a construction machine 15b. Sub-systems 18 connected via the on-board network 69 typically generate message objects 54 according to protocols which may be proprietary or standardised protocols. Information from a construction machine 15b may be extracted via a wireless connection or using a physical data port provided on the construction machine 15b.

Figure 12:
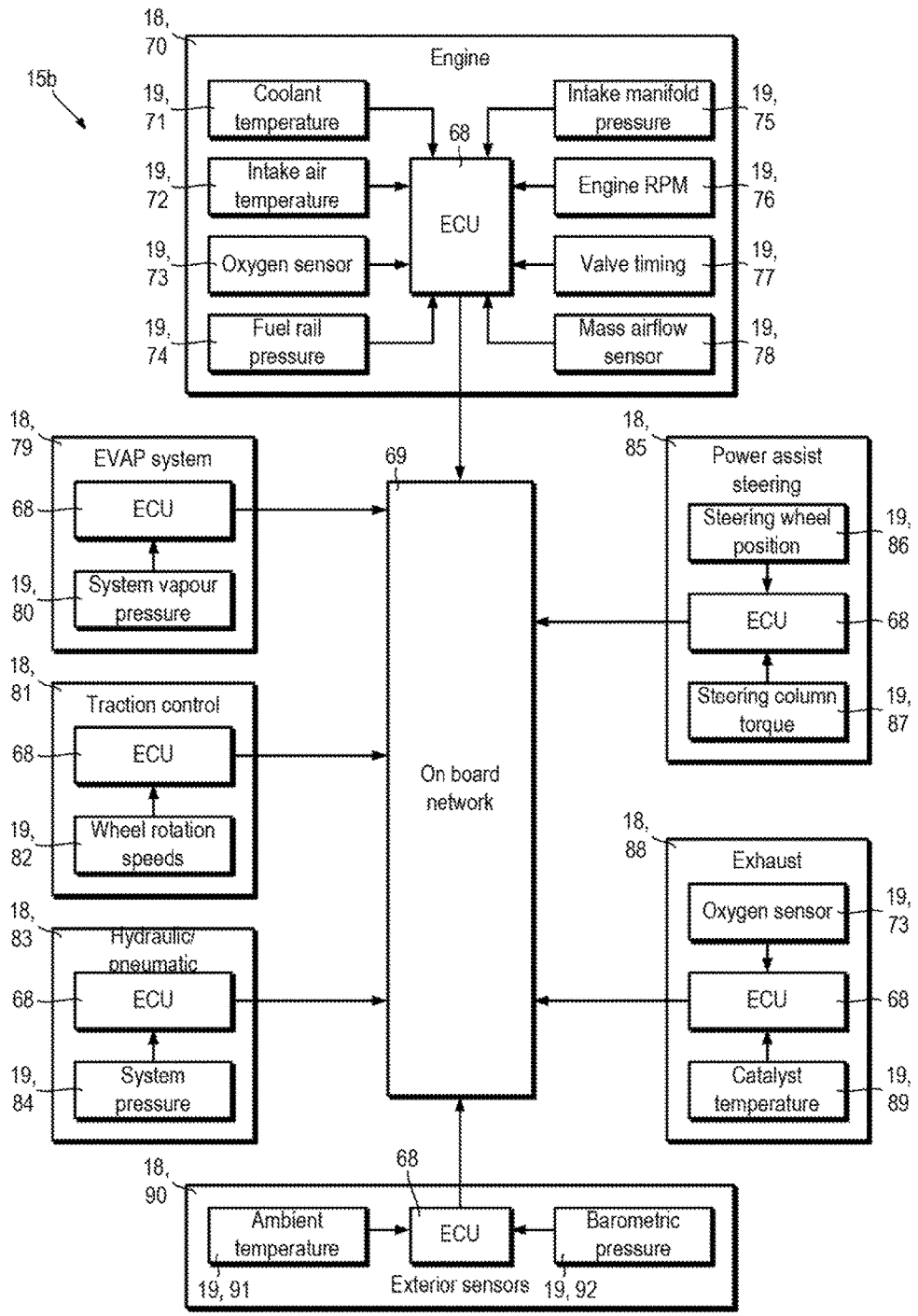
FIG. 12 is a block diagram illustrating sub-systems and sensors for construction machinery.

Referring also to FIG. 12, examples of construction machine 15b sub-systems 18 and associated sensors 19 are shown.

Many construction machines 15b include a diesel engine 70, which may include a large number of sensors 19 for use in regular operation, self-diagnostics, maintenance and/or repair. For example, a construction machine 15b diesel engine 70 may include, amongst other sensors 19, a coolant temperature sensor 71, an intake air sensor 72, one or more oxygen sensors 73 to monitor combustion efficiency, a fuel rail pressure sensor 74, an intake manifold gas pressure sensor 75, and engine RPM sensor 76, one or more valve timing sensors 77, a mass airflow sensor 78 and so forth.

Construction machines 15b may include an evaporative emissions control system 79 (EVAP system) including a vapour pressure sensor 80. Some construction machines 15b may include a traction control system 81 including wheel rotation speed sensors 82. Some construction machines 15b may include a hydraulic or pneumatic actuation system 83 including system pressure sensors 84, valve status sensors, load sensors and so forth, for controlling and monitoring actuation of tools such as a bull dozer scoop. Construction machines 15b may include a power assist steering system 85 including steering wheel position sensors 86 and steering column torque sensors 87. Construction machines 15b may include an exhaust system 88 including, for example, one or more oxygen concentration sensors 73 and one or more catalyst bed temperature sensors 89. Construction machines 15b may include exterior sensing systems 90 including sensors 19 such as, for example, ambient temperature sensors 91 and ambient barometric pressure 92 for determining the environmental conditions in which the construction machine 15b is operating.

The construction machine 15b may also store message logs 21 and global positioning system (GPS) (or other positioning system) logs 25. The message log 21 corresponding to a construction machine 15b may include message objects 54 generated by the ECUs 68, for example, according to OBD protocols. The message objects 54 may include a date and time, an identifier of an originating sub-system 18, and message contents such as, for example, a warning or fault identifier. Message logs 21 and global positioning system (GPS) logs 25 are stored in suitable computer readable formats or structures, such as XML files, database tables and so forth.

The second system 67 may also include manufacturer information 26 including, for example, databases providing information about messages and/or faults, suggested maintenance tasks, and manufacturer recommended tolerances for parameters measured by sensors 19. The second system 67 may also include environmental data 27 such as ambient temperatures, humidity and so forth, as a function of date, time and location. Such information may be relevant to predicting failure of construction machines 15b in a variety of ways. For example, a degraded battery system may not become evident to a user until it fails to supply sufficient current for a starter motor in colder ambient conditions. The degradation of the battery system may be detectable in sufficient time to allow replacement, however, whether or not battery replacement is the most critical preventative maintenance task may depend on the expected ambient temperatures. The second system 67 may also include a route/job log 28 corresponding to each construction machine 15b. The route/task log 28 for a construction machine 15b may include details of the start and end locations, routes traveled, dates and times of each journey, details of tasks assigned to the corresponding construction machine 15b and so forth. Route/task logs 28 may provide important contextual information for interpreting construction machine 15b sensor 19 data, for example, route information may be matched to elevation data to account for variations in engine power output of a tractor driving up or down a field located on an incline. The second system 67 may also include schedules 29 for the tasks which a fleet including a number of construction machines 15b need to be assigned to perform over a forthcoming time period. The second system 67 may also include facilities information 30 such as, for example, a type or class of available facilities at each location where a fleet of construction machines 15b operates or may operate. Examples of facilities information 30 may include locations of garages providing repair and/or re-fuelling, locations and availability of spare parts and/or geographical coverage and locations of breakdown recovery services.

The manufacturer information 26, environmental data 27, route/task logs 28, schedules 29 and facilities information 30 may be stored in suitable computer readable formats or structures, such as XML files, database tables, and so forth. The manufacturer information 26, environmental data 27, route/task logs 28, schedules 29 and facilities information 30 may be stored in one or more servers.

The maintenance logs 16, fault logs 17, sensors 19, message logs 21, GPS logs 25, manufacturer information 26, environmental data 27, route/task logs 28, schedules 29 and facilities information 30 are examples of data sources 2 for the data fusion system 1.

The second system 67 includes one or more analysis terminals 31 in the form of one or more computing systems 37.

The data fusion system 1 may be provided by one or more analysis servers 32 and one or more analysis terminals 31 may connect to the analysis server 32 as clients. Alternatively, each analysis terminal 31 may provide an example of the data fusion system 1. Examples of analysis terminals 31 may provide the same or different functions. For example, different analysis terminals 31 may be able to access different types of data or functions of the analysis server 32. For example, a scheduling terminal 34 may access data relating to risk model 6 outputs, schedules 29 and facilities information 30 to perform risk based scheduling of construction machine 15b tasks. As another example, a manufacturer terminal 35 may be given access to a reduced or redacted selection of data from the data sources 2, in order to allow monitoring and analysis of technical data whilst preserving the integrity of commercially sensitive information. A user device 94 such as a smartphone or tablet computer operated by the construction machine operator may also provide an analysis terminal 31 to enable the operator to receive timely and convenient notification of developing problems. In some examples, all analysis terminals 31 may access the same data and functions.

The analysis terminals 31 and analysis server 32 of the second system 67 communicate with the data sources 2 over a network 36 in the same way as the first system 14.

The second system 67 may include a number of machines 15 in the form of construction machines 15b, and all of the construction machines 15b forming part of the second exemplary system 67 are the same or comparable to one another.

The present specification is not limited to machines 15 in the form of ships 15a or construction machines 15b in the form of vehicles such as, for example, bulldozers, diggers, cranes, tractors, combine harvesters and so forth. The present specification is equally applicable to machines 15 in the form of any other type of vehicle such as, for example, trains, and so forth.

The present specification is not limited to vehicular machines 15, and may instead be applied to any type of machine 15 which includes sensors 19. For example, the present specification may be applied to sewage treatment equipment such as a sewage treatment plant. Unscheduled stoppages of a sewage treatment 3 plant can be very expensive in lost time. A sewage treatment plant is typically extremely complex and tracing and identifying the origin of a fault or anomaly can be difficult and time consuming. Therefore, the teachings of the present specification in relation to data driven identification and rectification of the source of a fault can provide advantages for a sewage treatment plant.

In a sewage treatment plant operating conditions are intended to be relatively stable. The embodiments of the present disclosure relating to dynamic time warping and incorporation of computer readable logs to provide contextual information can allow the present specification to be particularly useful for applications in which machines 15 are operated in variable conditions and/or for variable tasks. For example, tunnel boring equipment is complex machinery which is operated in a range of different environments and under a range of mechanical loadings. Each location for tunnel boring will have a different geological constitution, so that loading of a boring bit will vary with depth and distance of the bore hole in a different way at each drilling location. Additionally, boring locations can be remote, so that obtaining spare parts may take a long time in the event of an unanticipated failure. Therefore, the teachings of the present specification in relation to allocating resources to specific tasks can provide advantages for tunnel boring equipment.

System for Allocating Resources to Tasks

For each resource (for example a machine 15) in the multiple resource environment, predictive maintenance information such as a probability that a failure or maintenance event may occur within a certain future time period is provided. The predictive maintenance information may be derived from a risk model. The probability may be calculated based on metrics extracted from one or more of the sensor logs 53, message logs 21, maintenance logs 16, or fault logs 17.

A fault or maintenance event in a resource which renders it inoperable may have different consequences depending on the particular task or the stage in a task which that resource is performing. Embodiments of the invention allow tasks that would incur high costs were they to be interrupted to be allocated to resources having a low probability of experiencing a maintenance event.

Figure 13:
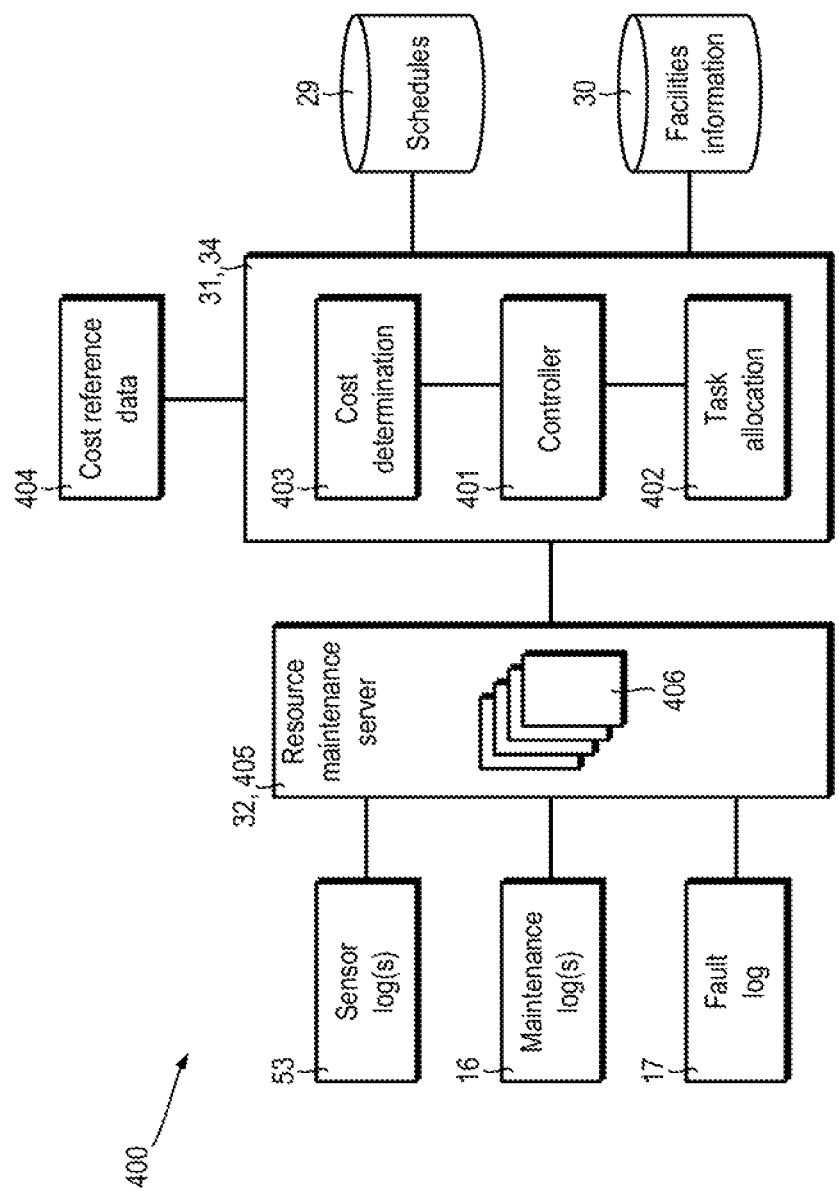
FIG. 13 is a block diagram of a system for allocating tasks to resources.

FIG. 13 is a schematic block diagram of a system 400 for allocating tasks to resources. The system 400 may be considered a special case of the generic systems shown in FIGS. 1 and 2.

The system 400 comprises a scheduling terminal 34. The scheduling terminal 34 comprises a controller 401 operable to control the functions carried out by the scheduling terminal 34. The scheduling terminal 34 comprises a task allocation module 402 configured to allocate resources (such as ships 15a or construction machines 15b) to particular tasks (such as particular routes or route circuits).

The scheduling terminal 34 comprises a cost determination module 403. The cost determination module 403 is configured to determine a cost incurred if a particular task is interrupted. Factors that may be considered when determining a cost are a time delay cost, a financial cost, a personnel cost, an equipment cost, a components cost. The cost determination module 403 may obtain data from various sources to enable cost calculation. For example, the cost determination module 403 may obtain route scheduling information 29 and facilities information 30 (for example, information regarding maintenance facilities at respective ports). When the machines 15 are ships 15a, the facilities information 30 may provide information regarding facilities present at respective ports. Examples include whether a port is a maintenance hub, a number of maintenance personnel present at a particular port, the type and amount of maintenance equipment and components (e.g. spare parts) and so forth. When the machines 15 are construction machines 15b, the facilities information 30 may provide information regarding locations and ranges of machine recovery services, depots for replacement construction machines, garage and/or repair facilities and so forth. In embodiments involving the allocation of ships 15a to route circuits, the cost determination module 403 is configured to determine likely costs for each of the routes or route circuits received from the schedules database 29. Furthermore, the cost determination module 403 may access a cost reference database 404 which may contain historic cost data that may be used in the cost calculation. Cost data may also be entered manually at an analysis terminal 31.

The system 400 comprises a resource maintenance server 405 which is an example of an analysis server 32. In embodiments where the resources in question are ships 15a the resource maintenance server 405 may be termed a fleet health server. The resource maintenance server 405 maintains maintenance records 406 for each resource in the multiple resource environment, for example for each ship 15a in a fleet. The maintenance records 406 contain maintenance data. The maintenance data for each resource may be data obtained from one or more of sensor logs 53, maintenance logs 16, fault logs 17 for that resource. The maintenance records 406 may contain one or more metrics determined from the maintenance data such as a probability value that a respective resource will experience a maintenance event within a given time frame.

The maintenance records 406 for each of the resources within the multiple resource environment are accessed by the task allocation module 402. The task allocation module 402 is operable to allocate tasks to respective resources based on information from the cost determination module 403 and the resource maintenance server 405.

The various components of the system 400 described above are configured to communicate with each other by any suitable wired or wireless connection, for example via the network 36.

Figure 14:
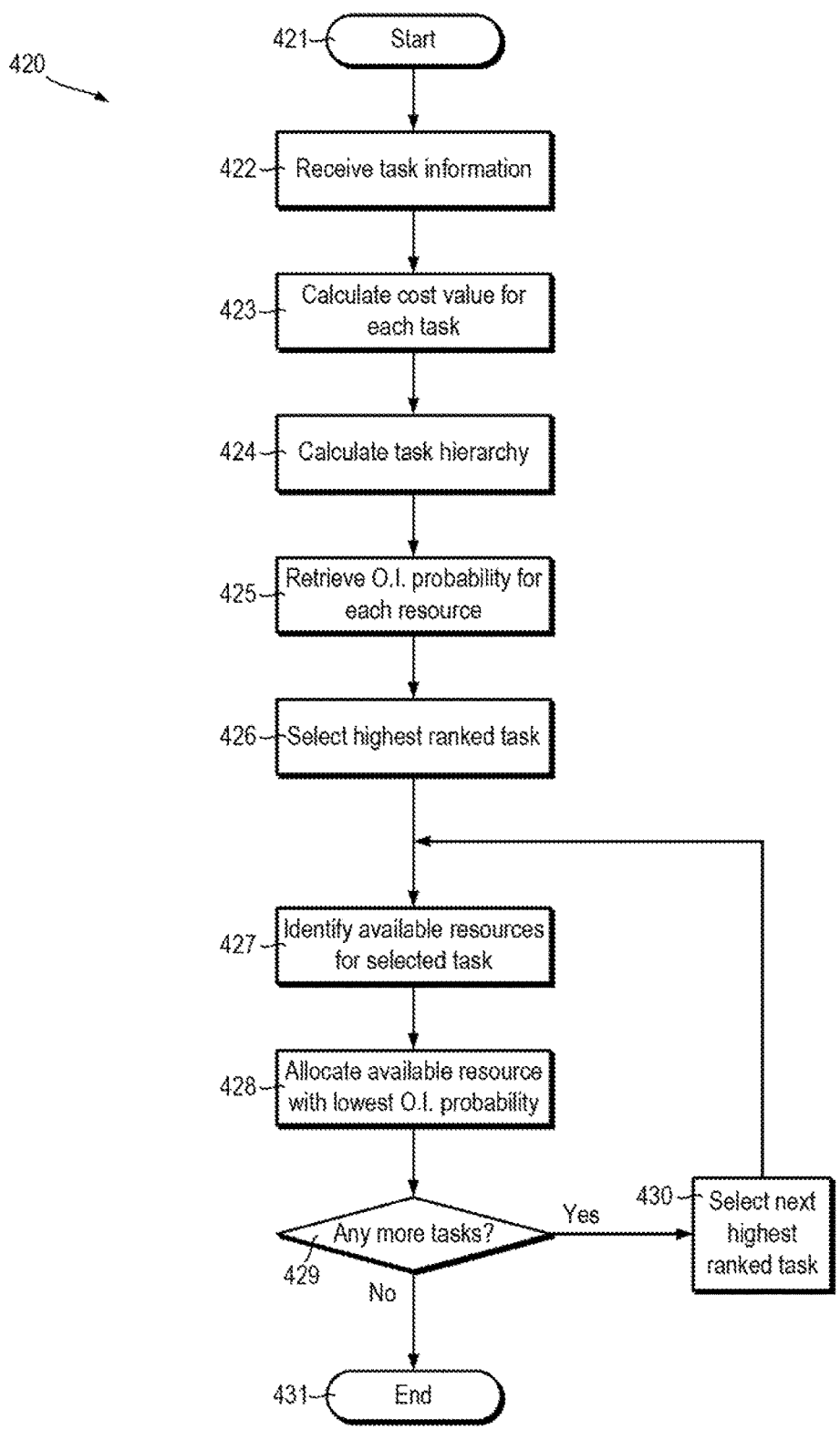
FIG. 14 is a flow chart illustrating a process for allocating a task to a particular resource in a multiple resource environment.

FIG. 14 is a flow chart illustrating a process 420 for allocating a task to a particular resource (for example machine 15) in a multiple resource environment. The process shown in FIG. 14 is carried out by one or more processors. In some embodiments, the processors are provided at a scheduling terminal 34. While the steps have been described in a particular order, it should be understood that the steps may be performed in a different order that would be evident to the skilled person.

The process 420 begins at step 421.

At step 422, the scheduling terminal 34 receives task information relating to one or more tasks. The task information may be a schedule of tasks to be completed. In some embodiments, the schedule of tasks may be a schedule of routes to be travelled by a fleet of ships. The route schedules may be obtained from the task information server 29. The route schedules may include location information indicating start points, end points and intermediate locations where ships 15a are scheduled to visit. The route schedule may be a single leg route whereby a ship 15a is scheduled to travel from directly from Seaport A to Seaport F. The route schedule may be a multi-leg route, also known as a route circuit, where a ship 15a is scheduled to travel from Seaport A to Seaport F via intermediate Seaports B, C, D and E. The route schedules may contain timing information indicating scheduled departure and arrival times at each of the respective ports.

The task information may specify resource criteria that need to be satisfied for a particular resource to be considered in order to carry out the task. For example, a task may be a particular route to be travelled from a particular start time. An example criterion for a ship 15a to be considered for allocation to that route may be that the ship 15 must be located at the route start point at least an hour before the start time for that route. Another example criterion may be that only ships 15a above a certain size may be considered to travel the particular route.

At step 423, the cost determination module 403 determines a cost incurred for each respective task if that task is interrupted. As explained above, the cost determination module 403 may use scheduling information 29 and/or cost reference data 404 to determine a cost associated with each of the tasks.

An overall cost score may be an aggregated cost score of a number of costs. Example costs include a financial cost, a time delay cost, an equipment cost (i.e. the cost of using a particular piece of equipment), a personnel cost, a component cost (i.e. there may be a given number of a particular component at a particular location), a machinery cost, distance cost and so forth. Each cost within the overall cost may be weighted by an appropriate multiplier. As such, an overall cost score for a failure during performance of a particular task can be determined which takes into account a number of different factors.

The overall cost score may be an expected cost that is calculated for each task. The expected cost for a particular task may be defined as the probability of an interruption to the task multiplied by the historical cost for such an interruption. The probability of an interruption to a task and the historical cost for such an interruption may be stored in and retrieved from the cost reference database 404.

At step 424, the cost determination module 403 forms a hierarchy of tasks by ranking the tasks according to their respective cost scores. Tasks having a higher cost score may be ranked above those tasks having lower cost scores.

At step 425, a maintenance event probability value for each of the resources is retrieved from the resource maintenance server 405.

At step 426, the task having the highest cost score is selected, i.e. task n=1. At step 427, resources available to carry out the selected task are identified. For example, if a task is to travel a route from Seaport A to Seaport B at 06:00 hours, an example criterion for a ship to be considered available for allocation may be that the ship 15a must be located at Seaport A at least an hour before the start time for that route, i.e. at 05:00 hours. Another example criterion may be that only ships above a certain size may be considered to travel the particular route.

At step 428, the available resource having the lowest maintenance event probability value is allocated to perform the task.

At step 429, the task allocation module 402 determines if there are any more tasks to be allocated to respective resources. If there are more tasks to be allocated, the task having the (n+1)$^{th}$ highest cost score is selected for allocation, at step 430. The next selected task is then processed through steps 427 and 428. Successive tasks may be selected in descending order of cost score ranking until it is determined that there are no further tasks to be allocated to a resource. The process ends at step 431.

Ships 15a determined to have a high risk of experiencing a maintenance event may be assigned to a route circuit consisting only of ports having advanced maintenance capabilities, e.g. a maintenance hub.

Ships 15a determined to have a moderate risk of experiencing a maintenance event may be assigned to a route circuit including some ports that have advanced maintenance capabilities, e.g. a maintenance hub. The route circuit may include other ports having a less advanced maintenance capability.

Ships 15a determined to have a low risk of experiencing a mechanical event may be assigned to a route circuit consisting only of ports having basic maintenance capabilities.

It will be appreciated that many modifications may be made to the embodiments hereinbefore described. Such modifications may involve equivalent and other features which are already known in the design, manufacture and use of data processing and analysis systems and which may be used instead of or in addition to features already described herein. Features of one embodiment may be replaced or supplemented by features of another embodiment.

Whilst embodiments have been described in relation to route scheduling for ships 15a, it should be understood that there are applications in alternative fields that fall within the scope of the invention.

For example, a fleet of construction machines 15b such as bulldozers may be required to perform a set of tasks. Maintenance information may be obtained from the resource maintenance server 405 in respect of each of the construction machines 15b. The locations of these tasks can be taken into account, for example proximity to a maintenance facility, to determine a cost incurred for each task in the event of a maintenance event. The tasks may then be allocated to the fleet of construction machines 15b so that tasks that would incur a high cost in the event of an maintenance event are allocated to construction machines 15b having a lower risk of a maintenance event.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention.

The invention claimed is:

1. A computer-implemented method of assigning a task to a resource in a multiple resource environment, the method being performed by one or more processors or special-purpose computing hardware, the method comprising:
   receiving task information relating to at least one task to be performed by a resource in the multiple resource environment;
   determining a cost score for each task of the at least one task, the cost score indicating a cost incurred if a maintenance event occurs during performance of the respective task during a specified interval;
   generating a machine learning model based on data associated with the multiple resources in the multiple resource environment, the data comprising any of sensor data, maintenance logs, or fault logs;
   receiving predictive maintenance information output from the machine learning model in relation to each of the multiple resources in the multiple resource environment, the predictive maintenance information indicating a likelihood of a maintenance event within the specified interval with respect to each of the multiple resources in the multiple resource environment; and
   allocating, for at least a portion of the specified interval, the at least one task to one of the resources in the multiple resource environment dependent on the predictive maintenance information of the multiple resources and the determined cost score, wherein if the at least one task has a high determined cost score relative to a first threshold, the at least one task is allocated to a particular resource of the multiple resource environment indicating a low likelihood of a maintenance event relative to a second threshold, and wherein if the at least one task has a low determined cost score relative to the first threshold, the at least one task is allocated to a different resource of the multiple resource environment indicating a high likelihood of a maintenance event relative to the second threshold.

2. The method of claim 1, further comprising ranking the multiple resources in accordance with the likelihood of a maintenance event with respect to each of the respective resources.

3. The method of claim 1, wherein allocating the at least one task to one of the resources comprises allocating the task to the resource having the lowest likelihood of a maintenance event.

4. The method of claim 1, wherein the task information relates to a plurality of tasks, the method further comprising ranking the plurality of tasks in accordance with the cost score of each of the respective tasks.

5. The method of claim 4, further comprising selecting the task having the highest cost score and allocating the selected task to an available resource having the lowest likelihood of a maintenance event.

6. The method of claim 1, wherein a subset of the multiple resources are identified as available resources based on one or more criteria related to the or each task.

7. The method of claim 1, wherein the cost incurred comprises one or more of a time cost, a financial cost, a personnel cost, a component cost, a machinery cost, and a distance cost.

8. The method of claim 1, wherein receiving predictive maintenance information comprises receiving maintenance information output from a machine learning model in relation to each of the resources.

9. The method of claim 8, wherein the maintenance information from a machine learning model comprises information derived from at least one of: sensor log data, fault log data, maintenance log data.

10. The method of claim 1, wherein the predictive maintenance information for each resource comprises an aggregated risk value based on risk values derived from one or more sub-systems of the resource.

11. A non-transitory computer-readable storage medium including instructions that, when executed by at least one processor of a computing system, cause the computing system to perform a method comprising:
   receiving task information relating to at least one task to be performed by a resource in the multiple resource environment;
   determining a cost score for each task of the at least one task, the cost score indicating a cost incurred if a maintenance event occurs during performance of the respective task during a specified interval;
   generating a machine learning model based on data associated with the multiple resources in the multiple resource environment, the data comprising any of sensor data, maintenance logs, or fault logs;
   receiving predictive maintenance information output from the machine learning model in relation to each of the multiple resources in the multiple resource environment, the predictive maintenance information indicating a likelihood of a maintenance event within the specified interval with respect to each of the multiple resources in the multiple resource environment; and
   allocating, for at least a portion of the specified interval, the at least one task to one of the resources in the multiple resource environment dependent on the predictive maintenance information of the multiple resources and the determined cost score, wherein if the at least one task has a high determined cost score relative to a first threshold, the at least one task is allocated to a particular resource of the multiple resource environment indicating a low likelihood of a maintenance event relative to a second threshold, and wherein if the at least one task has a low determined cost score relative to the first threshold, the at least one task is allocated to a different resource of the multiple resource environment indicating a high likelihood of a maintenance event relative to the second threshold.

12. A system for assigning a task to a resource in a multiple resource environment, the system comprising:
   one or more processors; and
   memory storing instructions that, when executed by the one or more processors, cause the system to:
      receive task information relating to at least one task to be performed by a resource in the multiple resource environment;
      determine a cost score for each task of the at least one task, the cost score indicating a cost incurred if a maintenance event occurs during performance of the respective task during a specified interval;
      generate a machine learning model based on data associated with the multiple resources in the multiple resource environment, the data comprising any of sensor data, maintenance logs, or fault logs;
      receive predictive maintenance information output from the machine learning model in relation to each of the multiple resources in the multiple resource environment, the predictive maintenance information indicating a likelihood of a maintenance event within the specified interval with respect to each of the multiple resources in the multiple resource environment; and
      allocate, for at least a portion of the specified interval, the at least one task to one of the resources in the multiple resource environment dependent on the predictive maintenance information of the multiple resources and the determined cost score, wherein if the at least one task has a high determined cost score relative to a first threshold, the at least one task is allocated to a particular resource of the multiple resource environment indicating a low likelihood of a maintenance event relative to a second threshold, and wherein if the at least one task has a low determined cost score relative to the first threshold, the at least one task is allocated to a different resource of the multiple resource environment indicating a high likelihood of a maintenance event relative to the second threshold.

13. The system according to claim 12, wherein the instructions further cause the system to rank the multiple resources in accordance with the likelihood of a maintenance event with respect to each of the respective resources.

14. The system according to claim 12, wherein the task information relates to a plurality of tasks and the cost determination module is configured to rank the plurality of tasks in accordance with the cost score of each of the respective tasks.

15. The system according to claim 12, wherein the predictive maintenance information for each resource comprises an aggregated risk value based on risk values derived from one or more sub-systems of the resource.

* * * * *